(12) United States Patent
Park et al.

(10) Patent No.: US 9,354,423 B2
(45) Date of Patent: May 31, 2016

(54) LENS MODULE

(71) Applicant: SAMSUNG ELECTRO-MECHANICS CO., LTD., Suwon-Si (KR)

(72) Inventors: Il Yong Park, Suwon-Si (KR); Yong Joo Jo, Suwon-Si (KR); Ju Hwa Son, Suwon-Si (KR); Jin Hwa Jung, Suwon-Si (KR); Jae Hyun Baik, Suwon-Si (KR); Ho Sik You, Suwon-Si (KR); Phil Ho Jung, Suwon-Si (KR); Kyu Min Chae, Suwon-Si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 14/321,782

(22) Filed: Jul. 1, 2014

(65) Prior Publication Data

US 2015/0131172 A1 May 14, 2015

(30) Foreign Application Priority Data

Nov. 8, 2013 (KR) .................. 10-2013-0135248
Jan. 23, 2014 (KR) .................. 10-2014-0008210
Feb. 27, 2014 (KR) .................. 10-2014-0023269

(51) Int. Cl.
*G02B 9/62* (2006.01)
*G02B 13/00* (2006.01)

(52) U.S. Cl.
CPC .............. *G02B 9/62* (2013.01); *G02B 13/0045* (2013.01)

(58) Field of Classification Search
CPC ......... G02B 9/62; G02B 9/64; G02B 13/0045
USPC .................................. 359/713, 756, 757, 759
See application file for complete search history.

(56) References Cited

U.S. PATENT DOCUMENTS

| 8,477,431 B2 | 7/2013 | Huang |
| 2012/0154929 A1 | 6/2012 | Tsai et al. |
| 2012/0188654 A1 | 7/2012 | Huang |
| 2012/0194726 A1 | 8/2012 | Huang |

(Continued)

FOREIGN PATENT DOCUMENTS

| CN | 102841432 A | 12/2012 |
| JP | 2011-85733 A | 4/2011 |

(Continued)

OTHER PUBLICATIONS

WO 2014162779 A1 translation, Google translate, inventor Nabeta K.*

(Continued)

*Primary Examiner* — Ricky Mack
*Assistant Examiner* — Gary O'Neill
(74) *Attorney, Agent, or Firm* — NSIP Law

(57) ABSTRACT

A lens module may include a first lens having positive refractive power, a second lens having positive refractive power, a third lens having refractive power, a fourth lens having positive refractive power, a fifth lens having negative refractive power, and a sixth lens having negative refractive power and having one or more inflection points formed on an image-side surface thereof. An overall focal length of the lens module f and a focal length of the first lens f1 may satisfy the following Conditional Expression:

$1.0 < f1/f < 2.0$    [Conditional Expression].

45 Claims, 13 Drawing Sheets

(56) References Cited

U.S. PATENT DOCUMENTS

| | | |
|---|---|---|
| 2012/0243108 A1 | 9/2012 | Tsai et al. |
| 2013/0016278 A1 | 1/2013 | Matsusaka et al. |
| 2013/0120858 A1 | 5/2013 | Sano |
| 2014/0111876 A1 | 4/2014 | Tang et al. |
| 2015/0029599 A1* | 1/2015 | Huang .................... 359/713 |

FOREIGN PATENT DOCUMENTS

| | | |
|---|---|---|
| KR | 10-2013-0039758 A | 4/2013 |
| TW | 201305595 A1 | 2/2013 |
| TW | 201344237 | 11/2013 |
| WO | WO 2011/118554 A1 | 9/2011 |
| WO | WO 2014162779 A1 * | 10/2014 |

OTHER PUBLICATIONS

European Search Report issued on Jul. 8, 2015 in counterpart European Application No. 14274144.5 (11 pages, in English).

Partial European Search Report dated Mar. 23, 2015 for European Patent Application No. 14275144.5.

Taiwanese Office Action issued Jul. 21, 2015 in counterpart Taiwanese Application TW 103122754 (18 pages, in Taiwanese, with English language translation).

Korean Office Action issued on Aug. 7, 2015, in counterpart Korean Application No. 10-2014-0023269 (3 pages in English, 3 pages in Korean).

* cited by examiner

| Surface | Radius | Thickness | Index | ABBE NUMBER | EFFECTIVE RADIUS |
|---|---|---|---|---|---|
| Object | Infinity | Infinity | | | |
| 1 | 1.883 | 0.474 | 1.544 | 56.1 | 1.055 |
| 2 | 3.194 | 0.081 | | | 0.935 |
| 3 | 2.558 | 0.477 | 1.544 | 56.1 | 0.934 |
| 4 | -38.953 | 0 | | | 0.906 |
| 5 | Infinity | 0.039 | | | 0.83 |
| 6 | 8.337 | 0.28 | 1.64 | 23.3 | 0.911 |
| 7 | 2.327 | 0.477 | | | 0.946 |
| 8 | -7.693 | 0.439 | 1.64 | 23.3 | 1.049 |
| 9 | -5.19 | 0.567 | | | 1.325 |
| 10 | -4.381 | 0.449 | 1.64 | 23.3 | 1.771 |
| 11 | -5.052 | 0.076 | | | 2.099 |
| 12 | 2.133 | 0.717 | 1.535 | 55.7 | 2.613 |
| 13 | 1.453 | 0.286 | | | 2.881 |
| 14 | Infinity | 0.3 | 1.517 | 64.2 | 3.04 |
| 15 | Infinity | 0.7 | | | 3.117 |
| 16 | Infinity | 0.046 | | | 3.405 |
| Image | Infinity | 0.013 | | | 3.433 |

FIG. 3

| Example 1 | 1 | 2 | 3 | 4 | 6 | 7 | 8 | 9 | 10 | 11 | 12 | 13 |
|---|---|---|---|---|---|---|---|---|---|---|---|---|
| Y RADIUS | 1.883 | 3.194 | 2.558 | -38.953 | 8.337 | 2.327 | -7.693 | -5.190 | -4.381 | -5.052 | 2.133 | 1.453 |
| CONIC CONSTANT (K) | -0.522 | -3.818 | -1.063 | 0.000 | 56.913 | -8.700 | -100.000 | 0.000 | -89.395 | 2.271 | -13.767 | -6.351 |
| 4-TH ORDER COEFFICIENT (A) | -0.012 | -0.085 | -0.085 | -0.112 | -0.149 | 0.033 | -0.093 | -0.049 | 0.036 | 0.081 | -0.112 | -0.070 |
| 6-TH ORDER COEFFICIENT (B) | 0.029 | 0.050 | 0.072 | 0.375 | 0.461 | 0.084 | -0.016 | -0.032 | -0.112 | -0.093 | 0.045 | 0.027 |
| 8-TH ORDER COEFFICIENT (C) | -0.128 | -0.098 | -0.187 | -0.851 | -1.004 | -0.094 | 0.165 | 0.109 | 0.088 | 0.056 | -0.014 | -0.009 |
| 10-TH ORDER COEFFICIENT (D) | 0.262 | 0.410 | 0.697 | 1.280 | 1.460 | -0.011 | -0.256 | -0.100 | -0.038 | -0.020 | 0.003 | 0.002 |
| 12-TH ORDER COEFFICIENT (E) | -0.295 | -0.644 | -1.094 | -1.355 | -1.532 | 0.130 | 0.195 | 0.059 | 0.009 | 0.004 | -0.001 | 0.000 |
| 14-TH ORDER COEFFICIENT (F) | 0.176 | 0.482 | 0.821 | 0.871 | 1.014 | -0.102 | -0.069 | -0.021 | -0.001 | 0.000 | 0.000 | 0.000 |
| 16-TH ORDER COEFFICIENT (G) | -0.042 | -0.143 | -0.249 | -0.248 | -0.297 | 0.036 | 0.000 | 0.003 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 4

| Surface | Radius | Thickness | Index | ABBE NUMBER | EFFECTIVE RADIUS |
|---|---|---|---|---|---|
| Object | Infinity | Infinity | | | |
| 1 | 1.951 | 0.481 | 1.544 | 56.1 | 1.09 |
| 2 | 3.3 | 0.139 | | | 1.02 |
| 3 | 2.696 | 0.494 | 1.544 | 56.1 | 0.98 |
| 4 | -10.355 | 0 | | | 0.91 |
| 5 | Infinity | 0.04 | | | 0.89 |
| 6 | 10.156 | 0.32 | 1.64 | 23.3 | 0.91 |
| 7 | 2.151 | 0.419 | | | 0.97 |
| 8 | -10.361 | 0.427 | 1.64 | 23.3 | 1.06 |
| 9 | -5.922 | 0.586 | | | 1.32 |
| 10 | -4.569 | 0.52 | 1.64 | 23.3 | 1.77 |
| 11 | -5.994 | 0.04 | | | 2.13 |
| 12 | 2.141 | 0.792 | 1.535 | 55.7 | 2.63 |
| 13 | 1.552 | 0.294 | | | 2.9 |
| 14 | Infinity | 0.3 | 1.517 | 64.2 | 3.12 |
| 15 | Infinity | 0.118 | | | 3.2 |
| 16 | Infinity | 0.582 | | | 3.26 |
| Image | Infinity | 0.01 | | | 3.54 |

FIG. 7

| Example 2 | 1 | 2 | 3 | 4 | 6 | 7 | 8 | 9 | 10 | 11 | 12 | 13 |
|---|---|---|---|---|---|---|---|---|---|---|---|---|
| Y RADIUS | 1.951 | 3.300 | 2.696 | -0.097 | 10.156 | 2.151 | -10.361 | -5.922 | -4.569 | -5.994 | 2.141 | 1.552 |
| CONIC CONSTANT (K) | -0.529 | -0.215 | 1.293 | -10.355 | 53.474 | -7.059 | -209.716 | 0.000 | -105.698 | 2.120 | -13.452 | -6.580 |
| 4-TH ORDER COEFFICIENT (A) | -0.007 | -0.033 | -0.036 | 0.000 | -0.052 | 0.035 | -0.082 | -0.042 | 0.029 | 0.060 | -0.095 | -0.056 |
| 6-TH ORDER COEFFICIENT (B) | 0.023 | -0.011 | 0.024 | 0.000 | 0.152 | 0.061 | -0.002 | -0.033 | -0.089 | -0.069 | 0.037 | 0.019 |
| 8-TH ORDER COEFFICIENT (C) | -0.101 | 0.042 | -0.135 | 0.048 | -0.406 | -0.088 | 0.129 | 0.105 | 0.068 | 0.041 | -0.012 | -0.006 |
| 10-TH ORDER COEFFICIENT (D) | 0.202 | -0.036 | 0.415 | -0.229 | 0.688 | 0.100 | -0.196 | -0.096 | -0.029 | -0.014 | 0.003 | 0.001 |
| 12-TH ORDER COEFFICIENT (E) | -0.222 | 0.013 | -0.629 | 0.438 | -0.767 | -0.097 | 0.139 | 0.052 | 0.006 | 0.003 | 0.000 | 0.000 |
| 14-TH ORDER COEFFICIENT (F) | 0.126 | 0.013 | 0.493 | -0.520 | 0.538 | 0.086 | -0.045 | -0.016 | 0.000 | 0.000 | 0.000 | 0.000 |
| 16-TH ORDER COEFFICIENT (G) | -0.029 | -0.010 | -0.157 | 0.392 | -0.173 | -0.031 | 0.000 | 0.002 | 0.000 | 0.000 | 0.000 | 0.000 |
| 18-TH ORDER COEFFICIENT (H) | 0.000 | 0.000 | 0.000 | -0.136 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 8

| Surface | Radius | Thickness | Index | ABBE NUMBER | EFFECTIVE RADIUS |
|---|---|---|---|---|---|
| Object | Infinity | Infinity | | | |
| 1 | 1.925 | 0.485 | 1.544 | 56.1 | 1.1 |
| 2 | 3.3 | 0.147 | | | 1.03 |
| 3 | 2.703 | 0.489 | 1.544 | 56.1 | 0.99 |
| 4 | -10.702 | 0 | | | 0.91 |
| 5 | Infinity | 0.04 | | | 0.89 |
| 6 | 9.512 | 0.302 | 1.64 | 23.3 | 0.91 |
| 7 | 2.126 | 0.418 | | | 0.96 |
| 8 | -10.361 | 0.427 | 1.64 | 23.3 | 1.05 |
| 9 | -6.204 | 0.57 | | | 1.33 |
| 10 | -4.428 | 0.542 | 1.64 | 23.3 | 1.79 |
| 11 | -5.785 | 0.04 | | | 2.13 |
| 12 | 2.086 | 0.792 | 1.535 | 55.7 | 2.61 |
| 13 | 1.532 | 0.3 | | | 2.9 |
| 14 | Infinity | 0.3 | 1.517 | 64.2 | 3.11 |
| 15 | Infinity | 0.118 | | | 3.19 |
| 16 | Infinity | 0.582 | | | 3.25 |
| Image | Infinity | 0.01 | | | 3.53 |

FIG. 11

| Example 3 | 1 | 2 | 3 | 4 | 6 | 7 | 8 | 9 | 10 | 11 | 12 | 13 |
|---|---|---|---|---|---|---|---|---|---|---|---|---|
| Y RADIUS | 1.925 | 3.300 | 2.703 | -10.702 | 9.512 | 2.126 | -10.361 | -6.204 | -4.428 | -5.785 | 2.086 | 1.532 |
| CONIC CONSTANT (K) | -0.496 | -0.164 | 1.264 | 0.000 | 53.474 | -6.884 | -209.716 | 0.000 | -105.698 | 2.120 | -13.452 | -6.489 |
| 4-TH ORDER COEFFICIENT (A) | -0.006 | -0.032 | -0.035 | 0.008 | -0.050 | 0.034 | -0.082 | -0.038 | 0.023 | 0.049 | -0.097 | -0.056 |
| 6-TH ORDER COEFFICIENT (B) | 0.021 | -0.003 | 0.016 | -0.018 | 0.118 | 0.059 | -0.002 | -0.040 | -0.074 | -0.048 | 0.041 | 0.020 |
| 8-TH ORDER COEFFICIENT (C) | -0.087 | -0.005 | -0.107 | 0.084 | -0.239 | -0.050 | 0.129 | 0.120 | 0.055 | 0.025 | -0.015 | -0.006 |
| 10-TH ORDER COEFFICIENT (D) | 0.170 | 0.065 | 0.319 | -0.399 | 0.263 | -0.025 | -0.196 | -0.117 | -0.023 | -0.008 | 0.004 | 0.001 |
| 12-TH ORDER COEFFICIENT (E) | -0.185 | -0.103 | -0.451 | 0.763 | -0.150 | 0.103 | 0.139 | 0.068 | 0.005 | 0.001 | -0.001 | 0.000 |
| 14-TH ORDER COEFFICIENT (F) | 0.104 | 0.081 | 0.337 | -0.642 | 0.059 | -0.076 | -0.045 | -0.023 | 0.000 | 0.000 | 0.000 | 0.000 |
| 16-TH ORDER COEFFICIENT (G) | -0.024 | -0.025 | -0.105 | 0.200 | -0.022 | 0.021 | 0.000 | 0.003 | 0.000 | 0.000 | 0.000 | 0.000 |
| 18-TH ORDER COEFFICIENT (H) | 0.000 | 0.000 | 0.000 | 0.000 | 0.000 | 0.000 | 0.000 | 0.000 | 0.000 | 0.000 | 0.000 | 0.000 |
| 20-TH ORDER COEFFICIENT (J) | 0.000 | 0.000 | 0.000 | 0.000 | 0.000 | 0.000 | 0.000 | 0.000 | 0.000 | 0.000 | 0.000 | 0.000 |

FIG. 12

LENS MODULE

CROSS-REFERENCE TO RELATED APPLICATIONS

This application claims the benefit of Korean Patent Application Nos. 10-2013-0135248 filed on Nov. 8, 2013, 10-2014-0008210 filed on Jan. 23, 2014 and 10-2014-0023269 filed on Feb. 27, 2014, with the Korean Intellectual Property Office, the disclosures of which are incorporated in their entireties herein by reference.

BACKGROUND

The present disclosure relates to a lens module having an optical system including six or more lenses.

Generally, a camera for a mobile communications terminal includes a lens module and an imaging device.

Such a lens module typically includes a plurality of lenses and includes an optical system including the plurality of lenses to capture an image of a subject to be projected onto the imaging device. In this regard, as an imaging device, a device such as a charge coupled device (CCD), or the like, is used, and such an imaging device generally has a pixel size of, for example, 1.4 μm or more.

However, in accordance with a gradual decrease in the sizes of mobile communications terminals and camera modules mounted therein, a pixel size of the imaging device has been decreased to, for example, 1.12 μm or less. Therefore, development of a lens module having a low F No. of, for example, 2.3 or less, at which a high degree of resolution may be implemented in images captured thereby, even under the above-mentioned conditions, has been demanded.

SUMMARY

Some embodiments of the present disclosure may provide a lens module capable of implementing high resolution in images captured thereby.

According to some embodiments of the present disclosure, a lens module may include: a first lens having positive refractive power; a second lens having positive refractive power; a third lens having refractive power; a fourth lens having positive refractive power; a fifth lens having negative refractive power; and a sixth lens having negative refractive power and having one or more inflection points formed on an image-side surface thereof.

According to some embodiments of the present disclosure, a lens module may include: a first lens having refractive power and having a convex object-side surface; a second lens having refractive power and having a convex object-side surface and a convex image-side surface; a third lens having refractive power and having a convex object-side surface; a fourth lens having refractive power; a fifth lens having refractive power; and a sixth lens having refractive power and having an aspherical shape in which two or more inflection points are formed on an object-side surface thereof and two or more inflection points are formed on an image-side surface thereof.

BRIEF DESCRIPTION OF DRAWINGS

The above and other aspects, features and other advantages of the present disclosure will be more clearly understood from the following detailed description taken in conjunction with the accompanying drawings, in which:

FIG. 3 is a table displaying characteristics of lenses illustrated in FIG. 1;

FIG. 4 is a table displaying aspherical surface coefficients of the lens module illustrated in FIG. 1;

FIG. 7 is a table displaying characteristics of lenses illustrated in FIG. 5;

FIG. 8 is a table displaying aspherical surface coefficients of the lens module illustrated in FIG. 5;

FIG. 11 is a table displaying characteristics of lenses illustrated in FIG. 9;

FIG. 12 is a table displaying aspherical surface coefficients of the lens module illustrated in FIG. 9.

DETAILED DESCRIPTION

Figure 1:
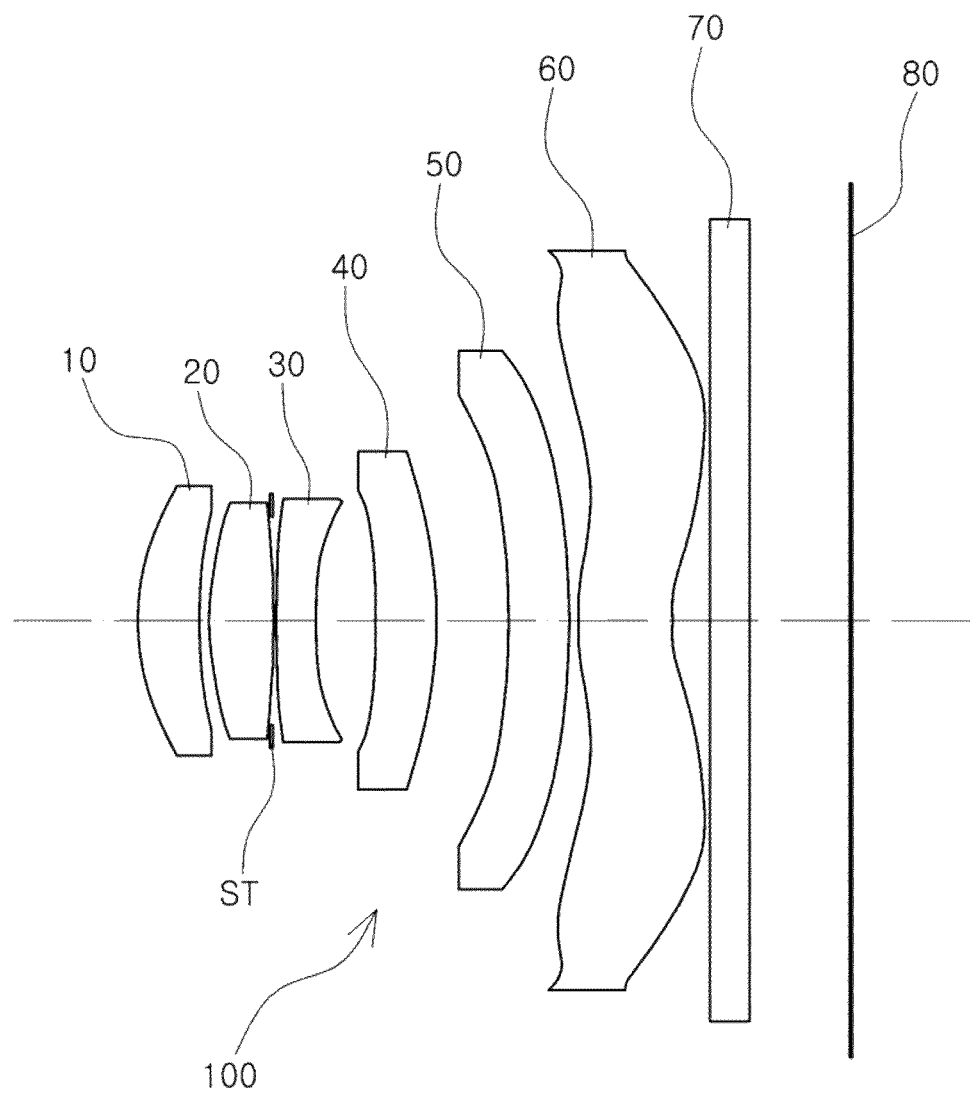
FIG. 1 is a configuration diagram of a lens module according to a first exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements. As used in this description and the appended claims, the singular forms "a", "an" and "the" are intended to include the plural forms as well, unless the context clearly indicates otherwise.

In description of exemplary embodiments, a first lens refers to a lens closest to an object side and a sixth lens refers to a lens closest to an image side. Further, the term 'front' refers to a direction from a lens module toward an object, while the term 'rear' refers to a direction from the lens module toward an image sensor. In addition, a first surface of each lens refers to a surface on the object side (or an object-side surface) and a second surface of each lens refers to a surface on the image side (or an image-side surface). Further, in the present specification, units of radii of curvature, thicknesses, Through-the-Lens (TTL) metering distances (or OAL), SLs, 2Ys, an overall focal length of an optical system, and a focal length of each lens may be in millimeters (mm). However, the unit of the above-mentioned physical properties is not limited thereto. In addition, thicknesses of the lenses, intervals between the lenses, the TTL (or OAL), and SL are distances measured based on an optical axis of the lens. Further, in lens shape descriptions, the meaning of one surface of a lens being convex is that an optical axis portion of a corresponding lens surface is convex, and the meaning of one surface of a lens being concave is that an optical axis portion of a corresponding lens surface is concave. Therefore, in the case that one surface of a lens is described as being convex, an edge portion of the lens may be concave. Likewise, in the case that one surface of a lens is described that one surface of the lens is concave, an edge portion of the lens may be convex. In addition, in the following detailed description, the term "inflection point" refers to a point at which a radius of curvature is changed in a portion that does not intersect the optical axis.

Figure 2:
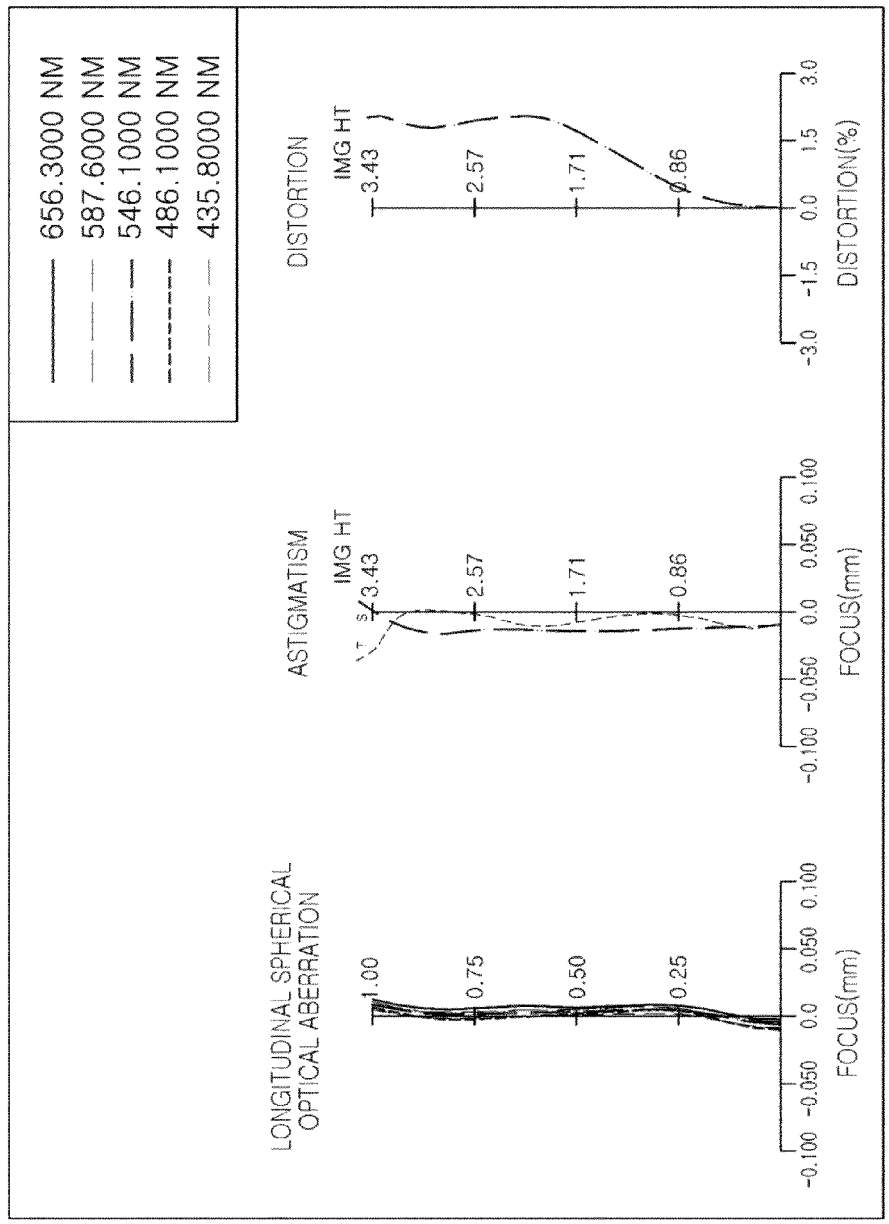
FIG. 2 is a graph illustrating optical aberration characteristics of the lens module illustrated in FIG. 1.
Figure 5:
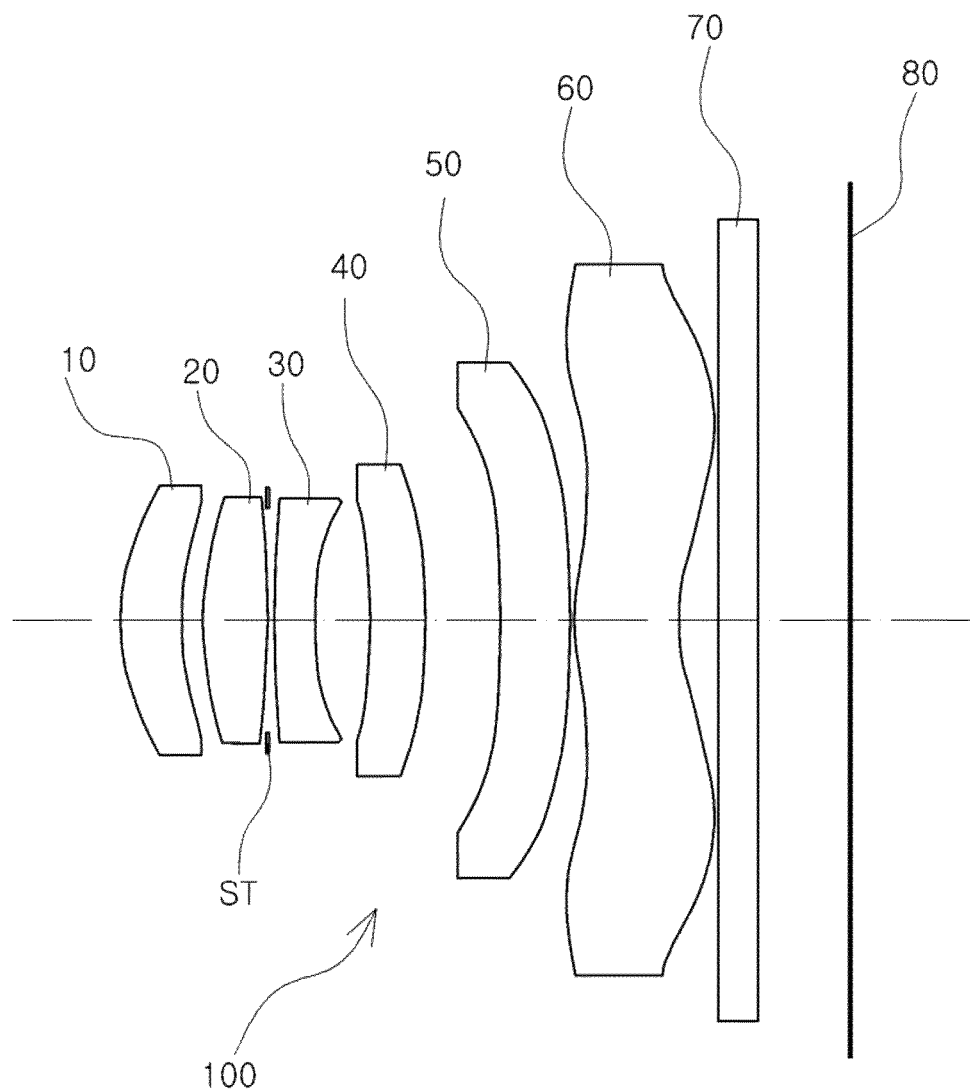
FIG. 5 is a configuration diagram of a lens module according to a second exemplary embodiment of the present disclosure.
Figure 6:
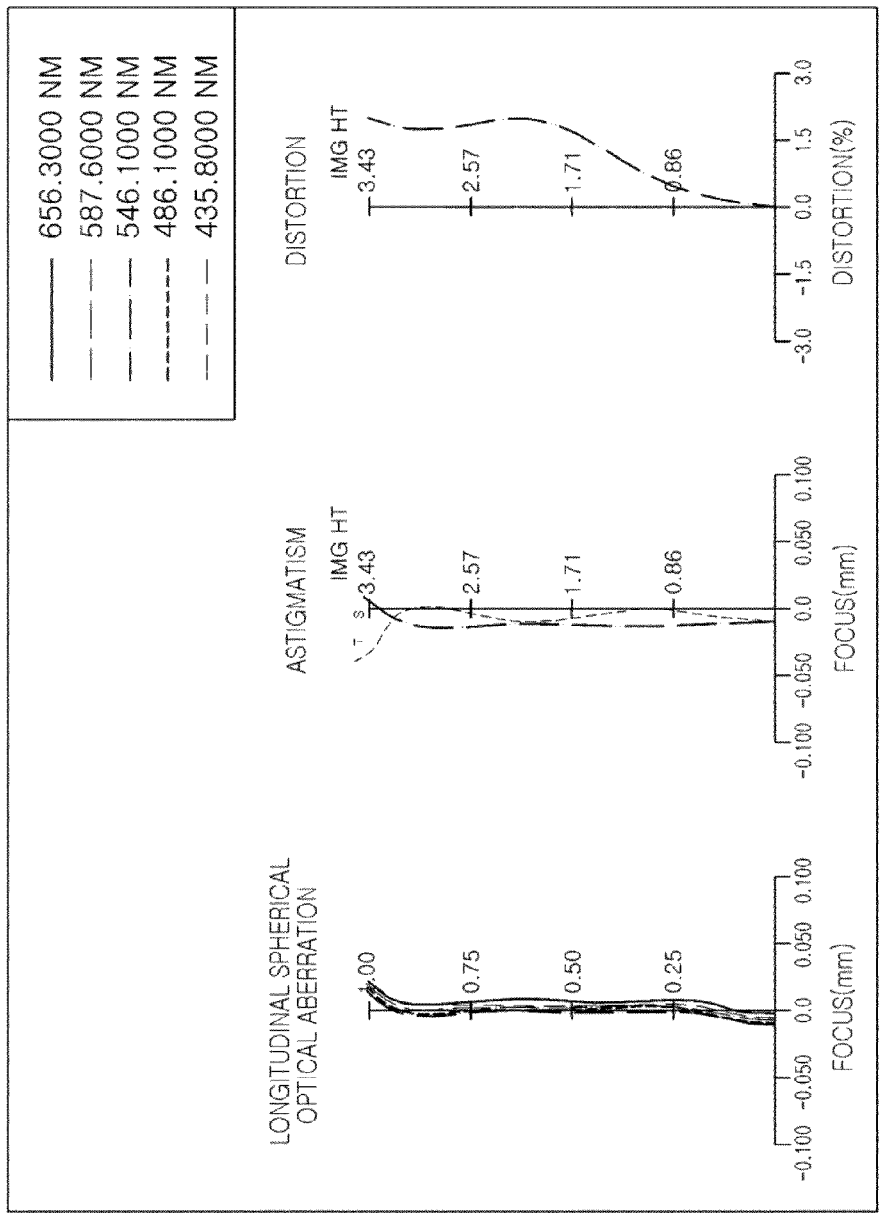
FIG. 6 is a graph illustrating optical aberration characteristics of the lens module illustrated in FIG. 5.
Figure 9:
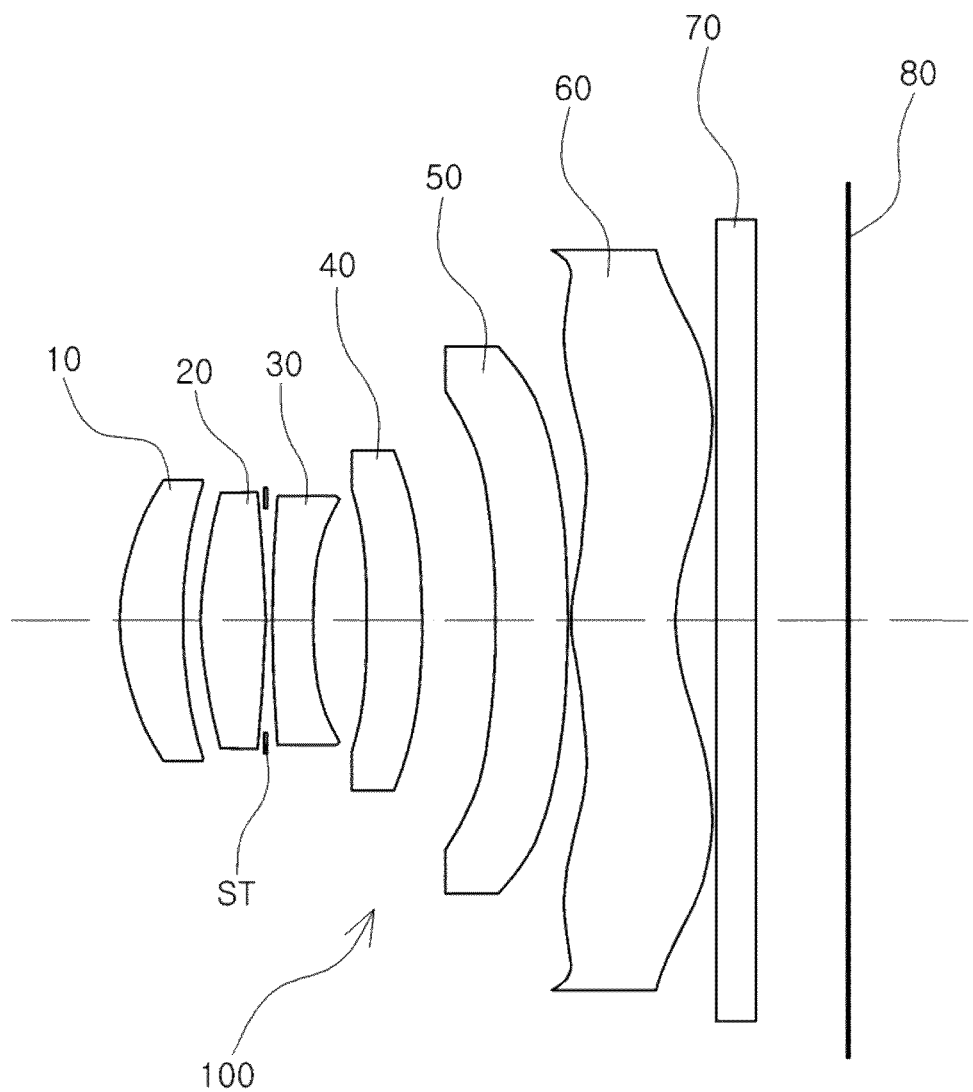
FIG. 9 is a configuration diagram of a lens module according to a third exemplary embodiment of the present disclosure.
Figure 10:
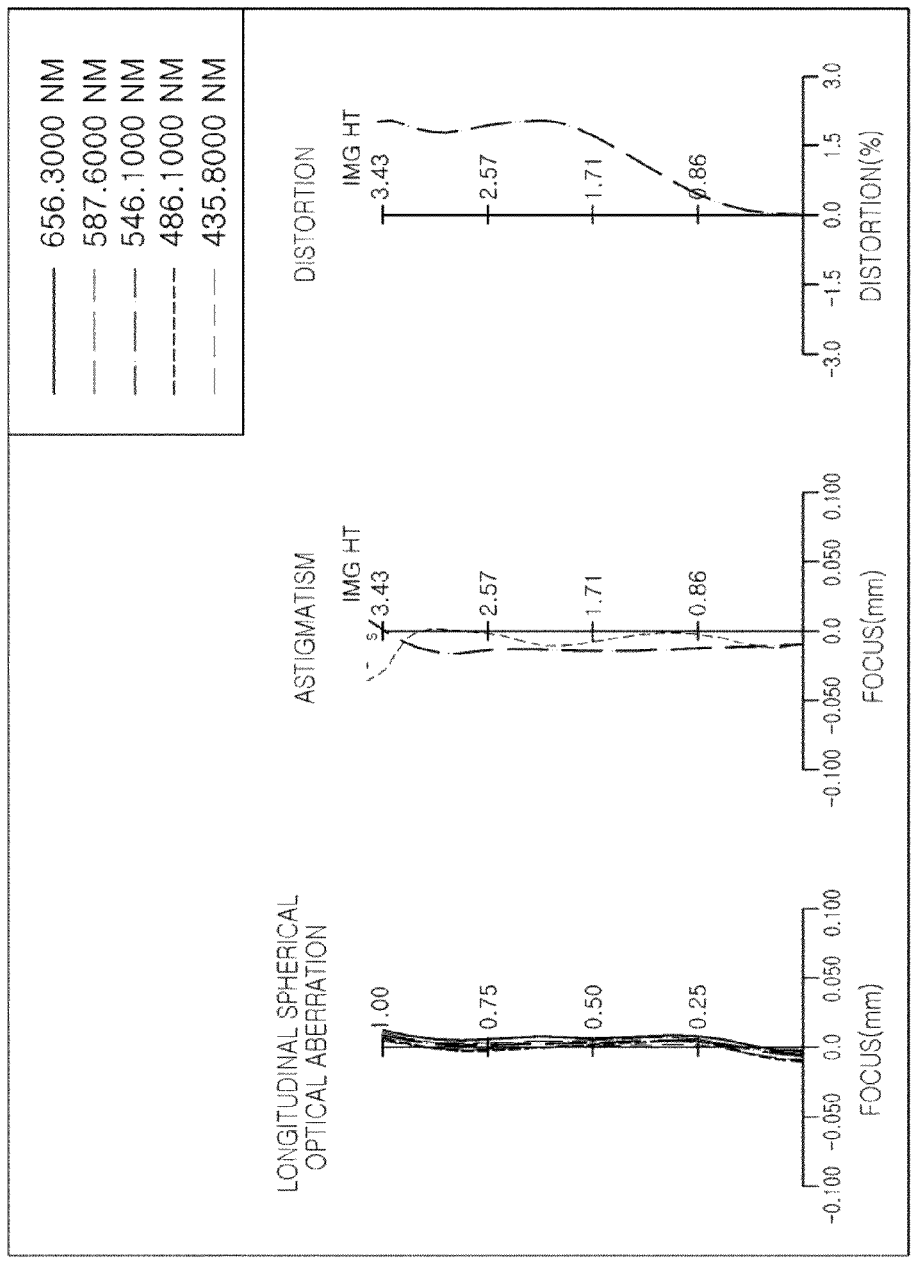
FIG. 10 is a graph illustrating optical aberration characteristics of the lens module illustrated in FIG. 9.
Figure 13:
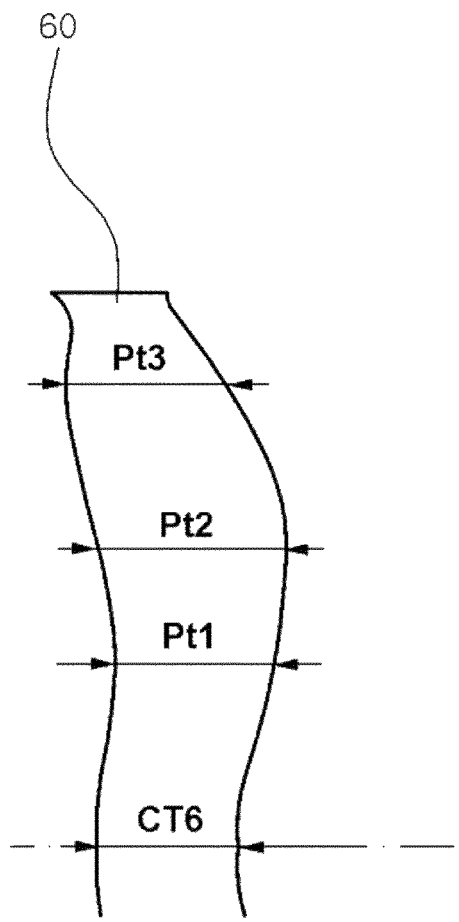
FIG. 13 is a partially enlarged diagram illustrating concave points and convex points of a sixth lens.

FIG. 1 is a configuration diagram of a lens module according to a first exemplary embodiment of the present disclosure; FIG. 2 is a graph illustrating optical aberration characteristics of the lens module illustrated in FIG. 1; FIG. 3 is a table displaying characteristics of lenses illustrated in FIG. 1; FIG. 4 is a table displaying aspherical surface coefficients of the lens module illustrated in FIG. 1; FIG. 5 is a configuration diagram of a lens module according to a second exemplary embodiment of the present disclosure; FIG. 6 is a graph illustrating optical aberration characteristics of the lens module illustrated in FIG. 5; FIG. 7 is a table displaying characteristics of lenses illustrated in FIG. 5; FIG. 8 is a table displaying aspherical surface coefficients of the lens module illustrated in FIG. 5; FIG. 9 is a configuration diagram of a lens module according to a third exemplary embodiment of the present disclosure; FIG. 10 is a graph illustrating optical aberration characteristics of the lens module illustrated in FIG. 9; FIG. 11 is a table displaying characteristics of lenses illustrated in FIG. 9; FIG. 12 is a table displaying aspherical surface coefficients of the lens module illustrated in FIG. 9; and FIG. 13 is a partially enlarged diagram illustrating concave points and convex points of a sixth lens.

A lens module according to the present disclosure may include an optical system including six or more lenses. For example, the lens module may include a first lens, a second lens, a third lens, a fourth lens, a fifth lens, and a sixth lens. However, the lens module is not limited to only including six lenses, and may further include other components or additional one or more lenses if necessary. For example, the lens module may include a stop for controlling an amount of light. In addition, the lens module may further include an infrared cut-off filter cutting off an infrared ray. Further, the lens module may further include an image sensor (that is, an imaging device) converting an image of a subject incident through the optical system into electrical signals. Further, the lens module may further include an interval maintaining member adjusting an interval between lenses. In addition to six lenses, one or more lenses may be arranged in front of the first lens, behind the sixth lens, or between the first and sixth lenses.

The first to sixth lenses configuring the optical system may be formed of plastic. In addition, at least one of the first to sixth lenses may have an aspherical surface. Further, the first to sixth lenses may have at least one aspherical surface, respectively. That is, at least one of first and second surfaces of the first to sixth lenses may be aspheric. Here, the aspherical surface of each lens may be represented by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20}$$ [Equation 1]

In Equation 1, c indicates curvature, k indicates a conic constant, r indicates a distance from any point on the aspherical surface to an optical axis, and constants A, B, C, D, E, F, G, H, and J sequentially indicate 4th-order, 6-th order, 8-th order, 10-th order, 12-th order, 14-th order, 16-th order, 18-th order, and 20th-order aspherical coefficients. In addition, Z is a height of a point of the aspherical surface having a distance of r from the optical axis.

The optical system including the first to sixth lenses may have F No. of 2.4 or less. In this case, the subject may be clearly imaged. For example, the lens module according to the present disclosure may clearly capture an image of the subject even under low illumination conditions (for example, 100 lux or less).

The lens module according to an exemplary embodiment of the present disclosure may satisfy the following Conditional Expression:

$1.0<f1/f<2.0$ [Conditional Expression]

Here, f is an overall focal length of the lens module, and f1 is a focal length of the first lens. The above Conditional Expression may indicate a numerical condition for optimizing refractive power of the first lens. For example, in the case in which f1/f is below the lower limit value of the above Conditional Expression, since the first lens has strong refractive power, an optical design of the second to fifth lenses may be limited. In the case in which f1/f is greater than the upper limit value of the above Conditional Expression, since the first lens has weak refractive power, it may be difficult to miniaturize the lens module.

The lens module according to an exemplary embodiment of the present disclosure may satisfy the following Conditional Expression:

$V1-V3>25.0$ [Conditional Expression]

Here, V1 is an Abbe number of the first lens, and V3 is an Abbe number of the third lens.

The lens module according to an exemplary embodiment of the present disclosure may satisfy the following Conditional Expression:

$n4>1.6$ [Conditional Expression]

Here, n4 is a refractive index of the fourth lens.

The lens module according to an exemplary embodiment of the present disclosure may satisfy the following Conditional Expression:

$V1-V5>25.0$ [Conditional Expression]

Here, V1 is the Abbe number of the first lens, and V5 is an Abbe number of the fifth lens.

The lens module according to an exemplary embodiment of the present disclosure may satisfy the following Conditional Expression:

$0.5<f2/f<1.5$ [Conditional Expression]

Here, f2 is a focal length of the second lens, and f is the overall focal length of the lens module.

The lens module according to an exemplary embodiment of the present disclosure may satisfy the following Conditional Expression:

$2.0<|f5/f|<100$ [Conditional Expression]

Here, f5 is a focal length of the fifth lens, and f is the overall focal length of the lens module.

The lens module according to an exemplary embodiment of the present disclosure may satisfy the following Conditional Expression:

$OAL/f<1.5$ [Conditional Expression]

Here, OAL is a distance from an object-side surface of the first lens to an image surface or an image sensor, and f is the overall focal length of the lens module.

The lens module according to an exemplary embodiment of the present disclosure may satisfy the following Conditional Expression:

$$1.0 < f1/f2 < 2.5 \quad \text{[Conditional Expression]}$$

Here, f1 is the focal length of the first lens, and f2 is the focal length of the second lens.

The lens module according to an exemplary embodiment of the present disclosure may satisfy the following Conditional Expression:

$$0.3 < |f2/f3| < 2.0 \quad \text{[Conditional Expression]}$$

Here, f2 is the focal length of the second lens, and f3 is a focal length of the third lens.

The lens module according to an exemplary embodiment of the present disclosure may satisfy the following Conditional Expression:

$$BFL/f > 0.2 \quad \text{[Conditional Expression]}$$

Here, BFL is a distance from an image-side surface of the sixth lens to the image surface, and f is the overall focal length of the lens module.

The lens module according to an exemplary embodiment of the present disclosure may satisfy the following Conditional Expression:

$$D1/f > 0.01 \quad \text{[Conditional Expression]}$$

Here, D1 is an air gap between the first lens and the second lens, and f is the overall focal length of the lens module.

The lens module according to an exemplary embodiment of the present disclosure may satisfy the following Conditional Expression:

$$r1/f > 0.3 \quad \text{[Conditional Expression]}$$

Here, r1 is a radius of curvature of the object-side surface of the first lens, and f is the overall focal length of the lens module.

The lens module according to an exemplary embodiment of the present disclosure may satisfy the following Conditional Expression:

$$r6/f > 0.3 \quad \text{[Conditional Expression]}$$

Here, r6 is a radius of curvature of an image-side surface of the third lens, and f is the overall focal length of the lens module.

The lens module according to an exemplary embodiment of the present disclosure may satisfy the following Conditional Expression:

$$EPD/2/f1 > 0.1 \quad \text{[Conditional Expression]}$$

Here, EPD/2 is a size of an entrance pupil [mm], f1 is the focal length of the first lens.

The lens module according to an exemplary embodiment of the present disclosure may satisfy the following Conditional Expression:

$$|f3/f| < 2.0 \quad \text{[Conditional Expression]}$$

Here, f3 is the focal length of the third lens, and f is the overall focal length of the lens module. The above Conditional Expression may indicate a condition for optimizing a magnitude of refractive power of the third lens with respect to the overall focal length of the lens module.

The lens module according to an exemplary embodiment of the present disclosure may satisfy the following Conditional Expression:

$$f4/f > 3.0 \quad \text{[Conditional Expression]}$$

Here, f4 is a focal length of the fourth lens, and f is the overall focal length of the lens module. The above Conditional Expression may indicate a condition for optimizing a magnitude of refractive power of the fourth lens with respect to the overall focal length of the lens module.

The lens module according to an exemplary embodiment of the present disclosure may satisfy the following Conditional Expression:

$$|f5/f| > 3.0 \quad \text{[Conditional Expression]}$$

Here, f5 is the focal length of the fifth lens, and f is the overall focal length of the lens module. The above Conditional Expression may indicate a condition for optimizing a magnitude of refractive power of the fifth lens with respect to the overall focal length of the lens module.

The lens module according to an exemplary embodiment of the present disclosure may satisfy the following Conditional Expression:

$$|f6/f| < 6.0 \quad \text{[Conditional Expression]}$$

Here, f6 is a focal length of the sixth lens, and f is the overall focal length of the lens module. The above Conditional Expression may indicate a condition for optimizing a magnitude of refractive power of the sixth lens with respect to the overall focal length of the lens module.

The lens module according to an exemplary embodiment of the present disclosure may satisfy the following Conditional Expression:

$$OAL/f1 > 0.5 \quad \text{[Conditional Expression]}$$

Here, OAL is the distance from the object-side surface of the first lens to the image surface, and f1 is the focal length of the first lens. The above Conditional Expression may indicate a condition for optimizing a magnitude of refractive power of the first lens with respect to the overall focal length of the lens module.

The lens module according to an exemplary embodiment of the present disclosure may satisfy the following Conditional Expression:

$$0 < OAL/f2 < 1.7 \quad \text{[Conditional Expression]}$$

Here, OAL is the distance from the object-side surface of the first lens to the image surface, and f2 is the focal length of the second lens. The above Conditional Expression may indicate a condition for optimizing a magnitude of refractive power of the second lens with respect to the overall focal length of the lens module.

The lens module according to an exemplary embodiment of the present disclosure may satisfy the following Conditional Expression:

$$|OAL/f3| > 1.0 \quad \text{[Conditional Expression]}$$

Here, OAL is the distance from the object-side surface of the first lens to the image surface, and f3 is the focal length of the third lens. The above Conditional Expression may indicate a condition for optimizing the magnitude of refractive power of the third lens with respect to the overall focal length of the lens module.

The lens module according to an exemplary embodiment of the present disclosure may satisfy the following Conditional Expression:

$$0 < OAL/f4 < 0.5 \quad \text{[Conditional Expression]}$$

Here, OAL is the distance from the object-side surface of the first lens to the image surface, and f4 is the focal length of the fourth lens. The above Conditional Expression may indicate a condition for optimizing the magnitude of refractive power of the fourth lens with respect to the overall focal length of the lens module.

The lens module according to an exemplary embodiment of the present disclosure may satisfy the following Conditional Expression:

$|OAL/f5|<0.5$ [Conditional Expression]

Here, OAL is the distance from the object-side surface of the first lens to the image surface, and f5 is the focal length of the fifth lens. The above Conditional Expression may indicate a condition for optimizing the magnitude of refractive power of the fifth lens with respect to the overall focal length of the lens module.

The lens module according to an exemplary embodiment of the present disclosure may satisfy the following Conditional Expression:

$|OAL/f6|>0.2$ [Conditional Expression]

Here, OAL is the distance from the object-side surface of the first lens to the image surface, and f6 is the focal length of the sixth lens. The above Conditional Expression may indicate a condition for optimizing the magnitude of refractive power of the sixth lens with respect to the overall focal length of the lens module.

The lens module according to an exemplary embodiment of the present disclosure may satisfy the following Conditional Expression:

$|f3/f4|<0.3$ [Conditional Expression]

Here, f3 is the focal length of the third lens, and f4 is the focal length of the fourth lens. The above Conditional Expression may indicate a condition for optimizing the magnitude of refractive power of the fourth lens with respect to refractive power of the third lens.

The lens module according to an exemplary embodiment of the present disclosure may satisfy the following Conditional Expression:

$|f4/f5|<0.7$ [Conditional Expression]

Here, f4 is the focal length of the fourth lens, and f5 is the focal length of the fifth lens. The above Conditional Expression may indicate a condition for optimizing the magnitude of refractive power of the fifth lens with respect to refractive power of the fourth lens.

The lens module according to an exemplary embodiment of the present disclosure may satisfy the following Conditional Expression:

$1.5<f5/f6<6.0$ [Conditional Expression]

Here, f5 is the focal length of the fifth lens, and f6 is the focal length of the sixth lens. The above Conditional Expression may indicate a condition for optimizing the magnitude of refractive power of the sixth lens with respect to refractive power of the fifth lens.

The lens module according to an exemplary embodiment of the present disclosure may satisfy the following Conditional Expression:

$|f1/f3|<3.0$ [Conditional Expression]

Here, f1 is the focal length of the first lens, and f3 is the focal length of the third lens. The above Conditional Expression may indicate a condition for optimizing the magnitude of refractive power of the third lens with respect to refractive power of the first lens. For example, in the case in which the third lens has the value |f1/f3| greater than the upper limit value of the above Conditional Expression, it may be difficult to correct chromatic optical aberration.

The lens module according to an exemplary embodiment of the present disclosure may satisfy the following Conditional Expression:

$0<f1/f4<1.5$ [Conditional Expression]

Here, f1 is the focal length of the first lens, and f4 is the focal length of the fourth lens. The above Conditional Expression may indicate a condition for optimizing the magnitude of refractive power of the fourth lens with respect to refractive power of the first lens. For example, in the case in which the fourth lens has the value f1/f4 greater than the upper limit value of the above Conditional Expression, it may be difficult to correct chromatic optical aberration.

The lens module according to an exemplary embodiment of the present disclosure may satisfy the following Conditional Expression:

$|f1/f5|<1.5$ [Conditional Expression]

Here, f1 is the focal length of the first lens, and f5 is the focal length of the fifth lens. The above Conditional Expression may indicate a condition for optimizing the magnitude of refractive power of the fifth lens with respect to refractive power of the first lens. For example, in the case in which the fifth lens has the value |f1/f5| equal to or greater than 1.5, it may be difficult to correct chromatic optical aberration.

The lens module according to an exemplary embodiment of the present disclosure may satisfy the following Conditional Expression:

$|f1/f6|<1.5$ [Conditional Expression]

Here, f1 is the focal length of the first lens, and f6 is the focal length of the sixth lens. The above Conditional Expression may indicate a condition for optimizing the magnitude of refractive power of the sixth lens with respect to refractive power of the first lens. For example, in the case in which the sixth lens has the value |f1/f6| equal to or greater than 1.5, it may be difficult to correct chromatic optical aberration.

The lens module according to an exemplary embodiment of the present disclosure may satisfy the following Conditional Expression:

$0<r2/f<1.2$ [Conditional Expression]

Here, r2 is a radius of curvature of an image-side surface of the first lens, and f is the overall focal length of the lens module. The above Conditional Expression may indicate a condition for optimizing a shape of the image-side surface of the first lens with respect to the overall focal length of the lens module.

The lens module according to an exemplary embodiment of the present disclosure may satisfy the following Conditional Expression:

$0.4<r3/f<1.2$ [Conditional Expression]

Here, r3 is a radius of curvature of an object-side surface of the second lens, and f is the overall focal length of the lens module. The above Conditional Expression may indicate a condition for optimizing a shape of the object-side surface of the second lens with respect to the overall focal length of the lens module.

The lens module according to an exemplary embodiment of the present disclosure may satisfy the following Conditional Expression:

$|r4/f|<10.0$ [Conditional Expression]

Here, r4 is a radius of curvature of an image-side surface of the second lens, and f is the overall focal length of the lens module. The above Conditional Expression may indicate a condition for optimizing a shape of the image-side surface of the second lens with respect to the overall focal length of the lens module.

The lens module according to an exemplary embodiment of the present disclosure may satisfy the following Conditional Expression:

$$r5/f>1.3 \quad \text{[Conditional Expression]}$$

Here, r5 is a radius of curvature of an object-side surface of the third lens, and f is the overall focal length of the lens module. The above Conditional Expression may indicate a condition for optimizing a shape of the object-side surface of the third lens with respect to the overall focal length of the lens module.

The lens module according to an exemplary embodiment of the present disclosure may satisfy the following Conditional Expression:

$$r6/f>0.4 \quad \text{[Conditional Expression]}$$

Here, r6 is the radius of curvature of the image-side surface of the third lens, and f is the overall focal length of the lens module. The above Conditional Expression may indicate a condition for optimizing a shape of the image-side surface of the third lens with respect to the overall focal length of the lens module.

The lens module according to an exemplary embodiment of the present disclosure may satisfy the following Conditional Expression:

$$|r7/f|>1.0 \quad \text{[Conditional Expression]}$$

Here, r7 is a radius of curvature of an object-side surface of the fourth lens, and f is the overall focal length of the lens module. The above Conditional Expression may indicate a condition for optimizing a shape of the object-side surface of the fourth lens with respect to the overall focal length of the lens module.

The lens module according to an exemplary embodiment of the present disclosure may satisfy the following Conditional Expression:

$$|r8/f|>0.5 \quad \text{[Conditional Expression]}$$

Here, r8 is a radius of curvature of an image-side surface of the fourth lens, and f is the overall focal length of the lens module. The above Conditional Expression may indicate a condition for optimizing a shape of the image-side surface of the fourth lens with respect to the overall focal length of the lens module.

The lens module according to an exemplary embodiment of the present disclosure may satisfy the following Conditional Expression:

$$|r9/f|>0.3 \quad \text{[Conditional Expression]}$$

Here, r9 is a radius of curvature of an object-side surface of the fifth lens, and f is the overall focal length of the lens module. The above Conditional Expression may indicate a condition for optimizing a shape of the object-side surface of the fifth lens with respect to the overall focal length of the lens module.

The lens module according to an exemplary embodiment of the present disclosure may satisfy the following Conditional Expression:

$$|r10/f|>0.4 \quad \text{[Conditional Expression]}$$

Here, r10 is the radius of curvature of an image-side surface of the fifth lens, and f is the overall focal length of the lens module. The above Conditional Expression may indicate a condition for optimizing a shape of the image-side surface of the fifth lens with respect to the overall focal length of the lens module.

The lens module according to an exemplary embodiment of the present disclosure may satisfy the following Conditional Expression:

$$0<r11/f<0.5 \quad \text{[Conditional Expression]}$$

Here, r11 is a radius of curvature of an object-side surface of the sixth lens, and f is the overall focal length of the lens module. The above Conditional Expression may indicate a condition for optimizing a shape of the object-side surface of the sixth lens with respect to the overall focal length of the lens module.

The lens module according to an exemplary embodiment of the present disclosure may satisfy the following Conditional Expression:

$$0<r12/f<0.4 \quad \text{[Conditional Expression]}$$

Here, r12 is a radius of curvature of an image-side surface of the sixth lens, and f is the overall focal length of the lens module. The above Conditional Expression may indicate a condition for optimizing a shape of the image-side surface of the sixth lens with respect to the overall focal length of the lens module.

The lens module according to an exemplary embodiment of the present disclosure may satisfy the following Conditional Expression:

$$2.0<D1/D2<5.0 \quad \text{[Conditional Expression]}$$

Here, D1 is the air gap between the first and second lenses, and D2 is an air gap between the second and third lenses.

The lens module according to an exemplary embodiment of the present disclosure may satisfy the following Conditional Expression:

$$D2/D3>0.08 \quad \text{[Conditional Expression]}$$

Here, D2 is the air gap between the second and third lenses, and D3 is an air gap between the third and fourth lenses.

The lens module according to an exemplary embodiment of the present disclosure may satisfy the following Conditional Expression:

$$D3/D4<2.0 \quad \text{[Conditional Expression]}$$

Here, D3 is the air gap between the third and fourth lenses, and D4 is an air gap between the fourth and fifth lenses.

The lens module according to an exemplary embodiment of the present disclosure may satisfy the following Conditional Expression:

$$D4/D5>5.0 \quad \text{[Conditional Expression]}$$

Here, D4 is the air gap between fourth and fifth lenses, and D5 is an air gap between the fifth and sixth lenses.

The lens module according to an exemplary embodiment of the present disclosure may satisfy the following Conditional Expression:

$$V4/30+V5/30<2.0 \quad \text{[Conditional Expression]}$$

Here, V4 is an Abbe number of the fourth lens, and V5 is the Abbe number of the fifth lens.

The above Conditional Expression may indicate a condition for enabling to easily manufacture the fourth and fifth lenses. For example, since the fourth and fifth lenses satisfying the above Conditional Expression have high refractive indexes, the lenses may have large radii of curvature. In the lens having the radius of curvature as described above, since a manufacturing tolerance is small, the lens may be easily manufactured. Further, since the lens having the radius of curvature as described above may decrease a distance between lenses, this lens may be advantageous for miniaturizing the lens module.

In the lens module according to an exemplary embodiment of the present disclosure, the sixth lens may have an aspherical shape in which two or more inflection points are formed on the object-side surface thereof, and/or two or more inflection points are formed on the image-side surface thereof.

In the lens module according to an exemplary embodiment of the present disclosure, an edge or peripheral portion of the object-side surface of the sixth lens may be convex.

In the lens module according to an exemplary embodiment of the present disclosure, an edge or peripheral portion of the image-side surface of the sixth lens may be convex.

In the lens module according to an exemplary embodiment of the present disclosure, the sixth lens may have an aspherical shape in which four inflection points may be formed on the object-side surface thereof.

In the lens module according to an exemplary embodiment of the present disclosure, the sixth lens may have an aspherical shape in which six inflection points may be formed on the object-side surface thereof.

In the lens module according to an exemplary embodiment of the present disclosure, the sixth lens may have an aspherical shape in which four inflection points may be formed on the image-side surface thereof.

In the lens module according to an exemplary embodiment of the present disclosure, the sixth lens may have an aspherical shape in which six inflection points may be formed on the image-side surface thereof.

The lens module according to an exemplary embodiment of the present disclosure may satisfy one or more of the following Conditional Expressions:

$0.03 < IP611/2Y < 0.04$ [Conditional Expression]

$0.20 < IP612/2Y < 0.30$ [Conditional Expression]

$0.27 < IP613/2Y < 0.48$ [Conditional Expression]

Here, IP611 is a radius from the optical axis of the sixth lens to an inflection point formed in a position closest to the optical axis among the inflection points formed on the object-side surface of the sixth lens, IP612 is a radius from the optical axis of the sixth lens to an inflection point formed in a position second-closest to the optical axis among the inflection points formed on the object-side surface of the sixth lens, IP613 is a radius from the optical axis of the sixth lens to an inflection point formed in a position third-closest to the optical axis among the inflection points formed on the object-side surface of the sixth lens, and 2Y is a diagonal length of the image surface.

The above Conditional Expressions may indicate conditions for optimizing a shape of the object-side surface of the sixth lens. For example, the sixth lens satisfying one or more of the above Conditional Expressions may improve optical aberration and/or resolution.

The lens module according to an exemplary embodiment of the present disclosure may satisfy one or more of the following Conditional Expressions:

$0.03 < IP621/2Y < 0.06$ [Conditional Expression]

$0.25 < IP622/2Y < 0.46$ [Conditional Expression]

$0.38 < IP623/2Y < 0.43$ [Conditional Expression]

Here, IP621 is a radius from the optical axis of the sixth lens to an inflection point formed in a position closest to the optical axis among the inflection points formed on the image-side surface of the sixth lens, IP622 is a radius from the optical axis of the sixth lens to an inflection point formed in a position second-closest to the optical axis among the inflection points formed on the image-side surface of the sixth lens, IP623 is a radius from the optical axis of the sixth lens to an inflection point formed in a position third-closest to the optical axis among the inflection points formed on the image-side surface of the sixth lens, and 2Y is the diagonal length of the image surface.

The above Conditional Expressions may indicate conditions for optimizing a shape of the image-side surface of the sixth lens. For example, the sixth lens satisfying one or more of the above Conditional Expressions may improve optical aberration and/or resolution.

The lens module according to an exemplary embodiment of the present disclosure may satisfy one or more of the following Conditional Expressions:

$0.08 < IP611/L61ER < 0.11$ [Conditional Expression]

$0.54 < IP612/L61ER < 0.76$ [Conditional Expression]

$0.97 < IP613/L61ER < 0.99$ [Conditional Expression]

Here, IP611 is the radius from the optical axis of the sixth lens to the inflection point formed in the position closest to the optical axis among the inflection points formed on the object-side surface of the sixth lens, IP612 is the radius from the optical axis of the sixth lens to the inflection point formed in the position second-closest to the optical axis among the inflection points formed on the object-side surface of the sixth lens, IP613 is the radius from the optical axis of the sixth lens to the inflection point formed in the position third-closest to the optical axis among the inflection points formed on the object-side surface of the sixth lens, and L61ER is a radius of an effective region on the object-side surface of the sixth lens in which incident light is refracted.

The above Conditional Expressions may indicate conditions for optimizing a shape and a size of the object-side surface of the sixth lens. For example, the above Conditional Expressions may indicate conditions for optimizing an effective size (e.g. an effective radius) of the sixth lens with respect to the shape of the sixth lens. The sixth lens satisfying one or more of the above Conditional Expressions may be advantageous for miniaturization of the lens module.

The lens module according to an exemplary embodiment of the present disclosure may satisfy one or more of the following Conditional Expressions:

$0.09 < IP621/L62ER < 0.13$ [Conditional Expression]

$0.85 < IP622/L62ER < 0.89$ [Conditional Expression]

$0.94 < IP623/L62ER < 0.99$ [Conditional Expression]

Here, P621 is the radius from the optical axis of the sixth lens to the inflection point formed in the position closest to the optical axis among the inflection points formed on the image-side surface of the sixth lens, IP622 is the radius from the optical axis of the sixth lens to the inflection point formed in the position second-closest to the optical axis among the inflection points formed on the image-side surface of the sixth lens, IP623 is the radius from the optical axis of the sixth lens to the inflection point formed in the position third-closest to the optical axis among the inflection points formed on the image-side surface of the sixth lens, and L62ER is a radius of an effective region on the image-side surface of the sixth lens in which incident light is refracted.

The above Conditional Expressions may indicate conditions for optimizing a shape and a size of the image-side surface of the sixth lens. For example, the above Conditional Expression may indicate a condition for optimizing an effective size (e.g. an effective radius) of the sixth lens with respect to the shape of the sixth lens. The sixth lens satisfying one or more of the above Conditional Expressions may be advantageous for miniaturization of the lens module.

The lens module according to an exemplary embodiment of the present disclosure may satisfy one or more of the following Conditional Expressions:

$1.02<Pt1/CT6<1.25$  [Conditional Expression]

$1.15<Pt2/CT6<1.43$  [Conditional Expression]

$1.02<Pt3/CT6<1.36$  [Conditional Expression]

$0.79<Pt1/Pt2<0.97$  [Conditional Expression]

$0.83<Pt1/Pt3<1.12$  [Conditional Expression]

$0.94<Pt2/Pt3<1.27$  [Conditional Expression]

Here, CT6 is a thickness of the sixth lens along the optical axis (or a thickness at the center of the six lens), Pt1 is a thickness at a first concave point, Pt2 is a thickness at a first convex point, and Pt3 is a second convex point.

The above Conditional Expressions may indicate conditions for optimizing distribution of refractive power of the sixth lens. For example, the sixth lens satisfying one or more of the above Conditional Expressions may uniformly project the incident light on the image surface. In addition, the sixth lens satisfying one or more of the above Conditional Expressions may decrease spherical optical aberration.

The lens module according to an exemplary embodiment of the present disclosure may satisfy one or more of the following Conditional Expressions:

$2.52<L61ER<2.72$  [Conditional Expression]

$2.68<L62ER<3.10$  [Conditional Expression]

Here, L61ER is the radius of the effective region on the object-side surface of the sixth lens in which incident light is refracted, and L62ER is the radius of the effective region on the image-side surface of the sixth lens in which incident light is refracted.

The above Conditional Expressions may be conditions for optimizing the size of the sixth lens. For example, the sixth lens satisfying one or more of the above Conditional Expressions may be advantageous for miniaturization for the lens module.

The lens module according to an exemplary embodiment of the present disclosure may satisfy at least one of the following Conditional Expressions:

$0.86<L11ER<1.30$  [Conditional Expression]

$0.74<L12ER<1.23$  [Conditional Expression]

Here, L11ER is a radius of an effective region in the object-side surface of the first lens at which incident light is refracted, and L12ER is a radius of an effective region in the image-side surface of the first lens at which incident light is refracted.

The above Conditional Expressions may be conditions for optimizing a size of the first lens. For example, the first lens satisfying one or more of the above Conditional Expressions may be advantageous for miniaturization for the lens module.

The lens module according to an exemplary embodiment of the present disclosure may satisfy at least one of the following Conditional Expressions:

$0.73<L21ER<1.30$  [Conditional Expression]

$0.70<L22ER<1.12$  [Conditional Expression]

Here, L21ER is a radius of an effective region in the object-side surface of the second lens at which incident light is refracted, and L22ER is a radius of an effective region in the image-side surface of the second lens at which incident light is refracted.

The above Conditional Expressions may be conditions for optimizing a size of the second lens. For example, the second lens satisfying one or more of the above Conditional Expressions may be advantageous for miniaturization for the lens module.

The lens module according to an exemplary embodiment of the present disclosure may satisfy the following Conditional Expression:

$0.70<L31ER<1.11$  [Conditional Expression]

$0.74<L32ER<1.17$  [Conditional Expression]

Here, L31ER is a radius of an effective region in the object-side surface of the third lens at which incident light is refracted, and L32ER is a radius of an effective region in the image-side surface of the third lens at which incident light is refracted.

The above Conditional Expressions may be conditions for optimizing a size of the third lens. For example, the third lens satisfying one or more of the above Conditional Expressions may be advantageous for miniaturization of the lens module.

Next, exemplary embodiments of the first to sixth lenses configuring the optical system will be described.

The first lens may have refractive power. For example, the first lens may have positive refractive power. A first surface (or an object-side surface) of the first lens may be convex, and a second surface (or an image-side surface) of the first lens may be concave. For example, the first lens may have a meniscus shape which is convex toward the object side. At least one of the first and second surfaces of the first lens may be aspheric. For example, both surfaces of the first lens may be aspheric. The first lens may be formed of a material having high light transmissivity and/or high workability. For example, the first lens may be formed of plastic. However, the material of the first lens is not limited to the plastic. For example, the first lens may be formed of glass.

The second lens may have refractive power. For example, the second lens may have positive refractive power. In addition, the second lens may have refractive power stronger than that of the first lens. For example, the focal length of the second lens may be shorter than that of the first lens (that is, the following Conditional Expression may be satisfied: $|f1|>|f2|$). Both surfaces of the second lens may be convex. At least one of first and second surfaces of the second lens may be aspheric. For example, both surfaces of the second lens may be aspheric. The second lens may be formed of a material having high light transmissivity and/or high workability. For example, the second lens may be formed of plastic. However, the material of the second lens is not limited to the plastic. For example, the second lens may be formed of glass.

The third lens may have refractive power. For example, the third lens may have negative refractive power. In addition, the third lens may have refractive power stronger than that of the fifth lens. For example, the focal length of the third lens may be shorter than that of the fifth lens (that is, the following Conditional Expression may be satisfied: $|f5|>|f3|$). A first surface of the third lens may be convex, and a second surface thereof may be concave. For example, the third lens may have a meniscus shape which is convex toward the object side or a plano-convex shape which is convex toward the object side.

At least one of the first and second surfaces of the third lens may be aspheric. For example, both surfaces of the third lens may be aspheric. The third lens may be formed of a material having high light transmissivity and/or high workability. For example, the third lens may be formed of plastic. However, the material of the third lens is not limited to the plastic. For example, the third lens may be formed of glass. Additionally, the third lens may be formed of a material having a high refractive index. For example, the third lens may be formed of a material having a refractive index of 1.60 or more (in this case, the third lens may have an Abbe number of 30 or less). Since the third lens formed of the material as described above may have a relatively large radius of curvature, the third lens may be easily manufactured. In addition, if the third lens is formed of at least one of the materials as described above, a manufacturing tolerance may be small and, a manufacturing defect rate of the lens module may be decreased. Further, the third lens formed of at least one of the materials as described above may decrease a distance between lenses, and may be advantageous for miniaturizing the lens module. In addition, the third lens may have a diameter smaller than those of the first and second lenses. For example, an effective diameter (e.g. a diameter of a portion on which effective light is substantially incident to thereby be refracted) of the third lens may be smaller than those of the first and second lenses.

The fourth lens may have refractive power. For example, the fourth lens may have positive refractive power. A first surface of the fourth lens may be concave, and a second surface thereof may be convex. For example, the fourth lens may have a meniscus shape in which it is convex toward the image side or a plano-convex shape in which it is convex toward the image side. At least one of the first and second surfaces of the fourth lens may be aspheric. For example, both surfaces of the fourth lens may be aspheric. The fourth lens may be formed of a material having high light transmissivity and high workability. For example, the fourth lens may be formed of plastic. However, the material of the fourth lens is not limited to the plastic. For example, the fourth lens may be formed of glass. For example, the fourth lens may be formed of a material having a high refractive index. For example, the fourth lens may be formed of a material having a refractive index of 1.60 or more (in this case, the fourth lens may have an Abbe number of 30 or less). Since the fourth lens formed of the material as described above may have a relatively large radius of curvature, the fourth lens may be easily manufactured. In addition, since in the fourth lens formed of the material as described above, a manufacturing tolerance is small, the manufacturing defect rate of the lens module may be decreased. Further, since the fourth lens formed of the material as described above may decrease a distance between lenses, the fourth lens may be advantageous for miniaturizing the lens module.

The fifth lens may have refractive power. For example, the fifth lens may have positive or negative refractive power. A first surface of the fifth lens may be concave, and a second surface of the fifth lens may be convex. For example, the fifth lens may have a meniscus shape which is convex toward the image side. At least one of the first and second surfaces of the fifth lens may be aspheric. For example, both surfaces of the fifth lens may be aspheric. The fifth lens may be formed of a material having high light transmissivity and/or high workability. For example, the fifth lens may be formed of plastic. However, the material of the fifth lens is not limited to the plastic. For example, the fifth lens may be formed of glass. Additionally, the fifth lens may be formed of a material having a high refractive index. For example, the fifth lens may be formed of a material having a refractive index of 1.60 or more (in this case, the fifth lens may have an Abbe number of 30 or less). The fifth lens formed of at least one of the materials as described above may have a relatively large radius of curvature, and may be easily manufactured. In addition, if the fifth lens is formed of at least one of the materials as described above, a manufacturing tolerance may be small, and the manufacturing defect rate of the lens module may be decreased. Further, the fifth lens formed of at least one of the materials as described above may decrease a distance between lenses, and may be advantageous for miniaturizing the lens module.

The sixth lens may have refractive power. For example, the sixth lens may have positive or negative refractive power. A first surface of the sixth lens may be convex and a second surface of the sixth lens may be concave. In addition, the sixth lens may have a shape in which at least one inflection point or turning point is formed on at least one surface of the sixth lens. For example, the second surface of the sixth lens may be concave at the center thereof or on an optical axis and become convex toward an edge or peripheral portion thereof. At least one of the first and second surfaces of the sixth lens may be aspheric. For example, both surfaces of the sixth lens may be aspheric. The sixth lens may be formed of a material having high light transmissivity and/or high workability. For example, the sixth lens may be formed of plastic. However, the material of the sixth lens is not limited to the plastic. For example, the sixth lens may be formed of glass.

Meanwhile, in the lens modules according to some exemplary embodiments, the lenses may be disposed so that the effective radius of the lens is decreased from the first lens toward the third lens and increased from the fourth lens toward the sixth lens. In the optical system configured as described above, an amount of light projected on the image sensor may be increased, such that resolution of the lens module may be improved.

In addition, some of exemplary embodiments of the lens module configured as described above may improve optical aberration, which causes image quality deterioration. Further, some of exemplary embodiment of the lens module configured as described above may improve resolution. Further, some of exemplary embodiments of the lens module configured as described above may be easy for lightness and be advantageous for decreasing a manufacturing cost.

A lens module according to a first exemplary embodiment of the present disclosure will be described with reference to FIGS. 1 through 4.

A lens module 100 according to the present exemplary embodiment may include an optical system including a first lens 10, a second lens 20, a third lens 30, a fourth lens 40, a fifth lens 50, and a sixth lens 60. The lens module 100 may further include an infrared cut-off filter 70 and an image sensor 80. In addition, the lens module 100 according to the present exemplary embodiment may have F No. of about 2.2 and a field of view (FOV) of about 70.5 degrees. Further, in the lens module 100 according to the present exemplary embodiment, all of the third to fifth lenses 30 to 50 may have a refractive index of about 1.640 and an Abbe number of about 23.3.

In the present exemplary embodiment, the first lens 10 may have positive refractive power. In addition, a first surface (or an object-side surface) of the first lens 10 may be convex, and a second surface (or an image-side surface) of the first lens 10 may be concave. The second lens 20 may have positive refractive power. In addition, both surfaces of the second lens 20 may be convex. The third lens 30 may have negative refractive power. In addition, a first surface of the third lens 30 may be convex, and a second surface of the third lens 30 may be concave. The fourth lens 40 may have positive refractive power. In addition, a first surface of the fourth lens 40 may be concave, and a second surface of the fourth lens 40 may be convex. The fifth lens 50 may have negative refractive power. In addition, a first surface of the fifth lens 50 may be concave, and a second surface thereof may be convex. The sixth lens 60 may have negative refractive power. In addition, a first surface of the sixth lens 60 may be convex, and a second surface of the sixth lens 60 may be concave. Further, the sixth lens 60 may have one or more inflection points. For example, the sixth lens 60 may have the inflection point formed on the second surface thereof. Meanwhile, the fourth lens 40 may be disposed so as to be close to the third lens 30. For example, an air gap between the fourth lens 40 and the third lens 30 may be smaller than an air gap between the fourth lens 40 and the fifth lens 50.

The lens module 100 according to the present exemplary embodiment may include one or more stops STs. For example, the stop ST may be disposed between the second lens 20 and the third lens 30. However, the stop ST may be disposed in front of the first lens 10, between the first lens 10 and the second lens 20 or anywhere between the third lens 30 and the sixth lens 60.

The lens module configured as described above may have optical aberration characteristics illustrated in FIG. 2 and may have lens characteristics illustrated in FIGS. 3 and 4. For reference, FIG. 3 is a table displaying radii of curvature, thicknesses of each lens and distances between lenses, refractive indices, Abbe numbers of the lenses, and FIG. 4 is a table displaying aspherical surface values of the lenses.

A lens module according to a second exemplary embodiment of the present disclosure will be described with reference to FIGS. 5 through 8.

A lens module 100 according to the present exemplary embodiment may include an optical system including a first lens 10, a second lens 20, a third lens 30, a fourth lens 40, a fifth lens 50, and a sixth lens 60. The lens module 100 may further include an infrared cut-off filter 70 and/or an image sensor 80. In addition, the lens module 100 according to the present exemplary embodiment may have F No. of about 2.3 and a FOV of about 70.2 degrees. Further, in the lens module 100 according to the present exemplary embodiment, all of the third to fifth lenses 30 to 50 have a refractive index of about 1.640 and an Abbe number of about 23.3.

In the present exemplary embodiment, the first lens 10 may have positive refractive power. In addition, a first surface (or an object-side surface) of the first lens 10 may be convex, and a second surface (or an image-side surface) of the first lens 10 may be concave. The second lens 20 may have positive refractive power. In addition, both surfaces of the second lens 20 may be convex. The third lens 30 may have negative refractive power. In addition, a first surface of the third lens 30 may be convex, and a second surface of the third lens 30 may be concave. The fourth lens 40 may have positive refractive power. In addition, a first surface of the fourth lens 40 may be concave, and a second surface of the fourth lens 40 may be convex. The fifth lens 50 may have negative refractive power. In addition, a first surface of the fifth lens 50 may be concave, and a second surface thereof may be convex. The sixth lens 60 may have negative refractive power. In addition, a first surface of the sixth lens 60 may be convex, and a second surface of the sixth lens 60 may be concave. Further, the sixth lens 60 may have one or more inflection points. For example, the sixth lens 60 may have the inflection point formed on the second surface thereof. Meanwhile, the fourth lens 40 may be disposed so as to be close to the third lens 30. For example, an air gap between the fourth lens 40 and the third lens 30 may be smaller than an air gap between the fourth lens 40 and the fifth lens 50.

The lens module 100 according to the present exemplary embodiment may include one or more stops STs. For example, the stop ST may be disposed between the second lens 20 and the third lens 30. However, the stop ST may be disposed in front of the first lens 10, between the first lens 10 and the second lens 20 or anywhere between the third lens 30 and the sixth lens 60.

The lens module configured as described above may have optical aberration characteristics illustrated in FIG. 6 and may have lens characteristics illustrated in FIGS. 7 and 8. For reference, FIG. 7 is a table displaying radii of curvature, thicknesses of each lens and distances between lenses, refractive indices, Abbe numbers of the lenses, and FIG. 8 is a table displaying aspherical surface values of the lenses.

A lens module according to a third exemplary embodiment of the present disclosure will be described with reference to FIGS. 9 through 12.

A lens module 100 according to the present exemplary embodiment may include an optical system including a first lens 10, a second lens 20, a third lens 30, a fourth lens 40, a fifth lens 50, and a sixth lens 60. The lens module 100 may further include an infrared cut-off filter 70 and/or an image sensor 80. In addition, the lens module 100 according to the present exemplary embodiment may have F No. of about 2.2 and a FOV of about 70.2 degrees. Further, in the lens module 100 according to the present exemplary embodiment, all of the third to fifth lenses 30 to 50 have a refractive index of about 1.640 and an Abbe number of about 23.3.

In the present exemplary embodiment, the first lens 10 may have positive refractive power. In addition, a first surface (or an object-side surface) of the first lens 10 may be convex, and a second surface (or an image-side surface) of the first lens 10 may be concave. The second lens 20 may have positive refractive power. In addition, both surfaces of the second lens 20 may be convex. The third lens 30 may have negative refractive power. In addition, a first surface of the third lens 30 may be convex, and a second surface of the third lens 30 may be concave. The fourth lens 40 may have positive refractive power. In addition, a first surface of the fourth lens 40 may be concave, and a second surface of the fourth lens 40 may be convex. The fifth lens 50 may have negative refractive power. In addition, a first surface of the fifth lens 50 may be concave, and a second surface of the fifth lens 50 may be convex. The sixth lens 60 may have negative refractive power. In addition, a first surface of the sixth lens 60 may be convex, and a second surface of the sixth lens 60 may be concave. Further, the sixth lens 60 may have one or more inflection points. For example, the sixth lens 60 may have the inflection point formed on the second surface thereof. Meanwhile, the fourth lens 40 may be disposed so as to be close to the third lens 30. For example, an air gap between the fourth lens 40 and the third lens 30 may be smaller than an air gap between the fourth lens 40 and the fifth lens 50.

The lens module 100 according to the present exemplary embodiment may include one or more stops STs. For example, the stop ST may be disposed between the second lens 20 and the third lens 30. However, the stop ST may be disposed in front of the first lens 10, between the first lens 10 and the second lens 20 or anywhere between the third lens 30 and the sixth lens 60.

The lens module configured as described above may have optical aberration characteristics illustrated in FIG. 10 and may have lens characteristics illustrated in FIGS. 11 and 12.

For reference, FIG. 11 is a table displaying radii of curvature, thicknesses of each lens and distances between lenses, refractive indices, Abbe numbers of the lenses, and FIG. 12 is a table displaying aspherical surface values of the lenses.

The above-mentioned exemplary embodiments may have optical characteristics illustrated in Table 1. In addition, the above-mentioned exemplary embodiments may satisfy Conditional Expressions illustrated on a left vertical column of Tables 2 to 4.

TABLE 1

|  | FIRST EXEMPLARY EMBODIMENT | SECOND EXEMPLARY EMBODIMENT | THIRD EXEMPLARY EMBODIMENT |
|---|---|---|---|
| f1 | 7.442 | 7.515 | 7.515 |
| f2 | 4.410 | 4.000 | 4.000 |
| f3 | −5.090 | −4.307 | −4.307 |
| f4 | 23.099 | 23.001 | 23.001 |
| f5 | −69.288 | −34.646 | −34.646 |
| f6 | −13.428 | −21.489 | −21.489 |
| TTL | 5.42 | 5.56 | 5.56 |
| FOV | 70.5 | 70.2 | 70.2 |
| F NO. | 2.20 | 2.30 | 2.20 |
| f | 4.74 | 4.77 | 4.77 |

TABLE 2

| CONDITIONAL EQUATION | FIRST EXEMPLARY EMBODIMENT | SECOND EXEMPLARY EMBODIMENT | THIRD EXEMPLARY EMBODIMENT |
|---|---|---|---|
| 1.0 < f1/f < 2.0 | 1.57 | 1.58 | 1.58 |
| V1 − V3 > 25 | 32.80 | 32.80 | 32.80 |
| n4 > 1.6 | 1.64 | 1.64 | 1.64 |
| V1 − V5 > 25 | 32.80 | 32.80 | 32.80 |
| 0.5 < f2/f < 1.5 | 0.93 | 0.84 | 0.84 |
| 2.0 < |f5/f| < 100 | 14.61 | 7.26 | 7.26 |
| OAL/f < 1.5 | 1.14 | 1.17 | 1.17 |
| 1.0 < f1/f2 < 2.5 | 1.69 | 1.88 | 1.88 |
| 0.3 < |f2/f3| < 2.0 | 0.87 | 0.93 | 0.93 |
| BFL/f > 0.2 | 0.28 | 0.27 | 0.27 |
| D1/f > 0.01 | 0.02 | 0.03 | 0.03 |
| r1/f > 0.3 | 0.40 | 0.41 | 0.40 |
| r6/f > 0.3 | 0.49 | 0.45 | 0.45 |
| EPD/2/f1 > 0.1 | 0.62 | 0.62 | 0.62 |

TABLE 3

| CONDITIONAL EQUATION | FIRST EXEMPLARY EMBODIMENT | SECOND EXEMPLARY EMBODIMENT | THIRD EXEMPLARY EMBODIMENT |
|---|---|---|---|
| |f3/f| < 2.0 | 1.07 | 0.90 | 0.90 |
| f4/f > 3.0 | 4.87 | 4.82 | 4.82 |
| |f5/f| > 3.0 | 14.61 | 7.26 | 7.26 |
| |f6/f| < 6.0 | 2.83 | 4.50 | 4.50 |
| OAL/f1 > 0.5 | 0.73 | 0.74 | 0.74 |
| 0 < OAL/f2 < 1.7 | 1.23 | 1.39 | 1.39 |
| |OAL/f3| > 1.0 | 1.07 | 1.29 | 1.29 |
| 0 < OAL/f4 < 0.5 | 0.23 | 0.24 | 0.24 |
| |OAL/f5| < 0.5 | 0.08 | 0.16 | 0.16 |
| |OAL/f6| > 0.2 | 0.40 | 0.26 | 0.26 |
| |f3/f4| < 0.3 | 0.22 | 0.19 | 0.19 |
| |f4/f5| < 0.7 | 0.33 | 0.66 | 0.66 |
| 1.5 < |f5/f6| < 6.0 | 5.16 | 1.61 | 1.61 |
| |f1/f3| < 3.0 | 1.46 | 1.74 | 1.74 |
| 0 < f1/f4 < 1.5 | 0.32 | 0.33 | 0.33 |
| |f1/f5| < 1.5 | 0.11 | 0.22 | 0.22 |
| |f1/f6| < 1.5 | 0.55 | 0.35 | 0.35 |

TABLE 4

| CONDITIONAL EQUATION | FIRST EXEMPLARY EMBODIMENT | SECOND EXEMPLARY EMBODIMENT | THIRD EXEMPLARY EMBODIMENT |
|---|---|---|---|
| 0 < r2/f < 1.2 | 0.67 | 0.69 | 0.69 |
| 0.4 < r3/f < 1.2 | 0.54 | 0.57 | 0.57 |
| |r4/f| < 10.0 | 8.21 | 2.17 | 2.24 |
| r5/f > 1.3 | 1.76 | 2.13 | 1.99 |
| r6/f > 0.4 | 0.49 | 0.45 | 0.45 |
| |r7/f| > 1.0 | 1.62 | 2.17 | 2.17 |
| |r8/f| > 0.5 | 1.09 | 1.24 | 1.30 |
| |r9/f| > 0.3 | 0.92 | 0.96 | 0.93 |
| |r10/f| > 0.4 | 1.07 | 1.26 | 1.21 |
| 0 < r11/f < 0.5 | 0.45 | 0.45 | 0.44 |
| 0 < r12/f < 0.4 | 0.31 | 0.33 | 0.32 |
| 2.0 < D1/D2 < 5.0 | 2.08 | 3.48 | 3.68 |
| D2/D3 > 0.08 | 0.08 | 0.10 | 0.10 |
| D3/D4 < 2.0 | 0.84 | 0.72 | 0.73 |
| D4/D5 > 5.0 | 7.46 | 14.65 | 14.25 |
| V4/30 + V5/30 < 2.0 | 1.55 | 1.55 | 1.55 |

The following Table 5 shows an effective radius of the sixth lens and positions of inflection points formed on the object-side surface and the image-side surface of the sixth lens.

TABLE 5

|  |  | FIRST EXEMPLARY EMBODIMENT | SECOND EXEMPLARY EMBODIMENT | THIRD EXEMPLARY EMBODIMENT |
|---|---|---|---|---|
| 2Y |  | 6.86 | 6.86 | 6.86 |
| ER | OBJECT SIDE | 2.61 | 2.62 | 2.61 |
|  | IMAGE SIDE | 2.88 | 2.9 | 2.9 |
| FIRST INFLECTION POINT | OBJECT SIDE | 0.24 | 0.25 | 0.24 |
|  | IMAGE SIDE | 0.31 | 0.33 | 0.33 |
| SECOND INFLECTION POINT | OBJECT SIDE | 1.7 | 1.69 | 1.7 |
|  | IMAGE SIDE | 2.51 | 2.45 | 2.45 |
| THIRD INFLECTION POINT | OBJECT SIDE | 2.58 | 2.59 | 2.56 |
|  | IMAGE SIDE | 2.77 | 2.83 | 2.83 |

The following Table 6 shows thicknesses at convex points and concave points formed on the sixth lens.

TABLE 6

|  | FIRST EXEMPLARY EMBODIMENT | SECOND EXEMPLARY EMBODIMENT | THIRD EXEMPLARY EMBODIMENT |
| --- | --- | --- | --- |
| CT6 | 0.716 | 0.791 | 0.792 |
| Pt1 | 0.814 | 0.892 | 0.898 |
| Pt2 | 0.932 | 1.008 | 1.015 |
| Pt3 | 0.809 | 0.968 | 0.977 |

According to some exemplary embodiments of the present disclosure, high resolution may be implemented.

While exemplary embodiments have been shown and described above, it will be apparent to those skilled in the art that modifications and variations could be made without departing from the spirit and scope of the present disclosure as defined by the appended claims.

What is claimed is:

1. A lens module comprising:
   a first lens having positive refractive power;
   a second lens having positive refractive power;
   a third lens having refractive power;
   a fourth lens having positive refractive power;
   a fifth lens having negative refractive power; and
   a sixth lens having negative refractive power and having at least three inflection points formed on an image-side surface thereof,
   wherein an overall focal length of the lens module f and a focal length of the first lens f1 satisfy the following Conditional Expression:

$1.0 < f1/f < 2.0$ [Conditional Expression].

2. The lens module of claim 1, wherein an object-side surface of the first lens is convex, and an image-side surface of the first lens is concave.

3. The lens module of claim 1, wherein an object-side surface of the second lens is convex, and an image-side surface of the second lens is convex.

4. The lens module of claim 1, wherein an object-side surface of the third lens is convex, and an image-side surface of the third lens is concave.

5. The lens module of claim 1, wherein an object-side surface of the fourth lens is concave, and an image-side surface of the fourth lens is convex.

6. The lens module of claim 1, wherein an object-side surface of the fifth lens is concave, and an image-side surface of the fifth lens is convex.

7. The lens module of claim 1, wherein an object-side surface of the sixth lens is convex, and the image-side surface of the sixth lens is concave.

8. The lens module of claim 1, wherein the sixth lens has a shape in which one or more inflection points are formed on an object-side surface thereof.

9. The lens module of claim 1, wherein the lens module satisfies the following Conditional Expression:

$V1 - V3 > 25.0$ [Conditional Expression]

where V1 is an Abbe number of the first lens, and V3 is an Abbe number of the third lens.

10. The lens module of claim 1, wherein the lens module satisfies the following Conditional Expression:

$n4 > 1.6$ [Conditional Expression]

where n4 is a refractive index of the fourth lens.

11. The lens module of claim 1, wherein the lens module satisfies the following Conditional Expression:

$V1 - V5 > 25.0$ [Conditional Expression]

where V1 is an Abbe number of the first lens, and V5 is an Abbe number of the fifth lens.

12. The lens module of claim 1, wherein the lens module satisfies the following Conditional Expression:

$0.5 < f2/f < 1.5$ [Conditional Expression]

where f2 is a focal length of the second lens, and f is the overall focal length of the lens module.

13. The lens module of claim 1, wherein the lens module satisfies the following Conditional Expression:

$2.0 < |f5/f| < 100$ [Conditional Expression]

where f5 is a focal length of the fifth lens, and f is the overall focal length of the lens module.

14. The lens module of claim 1, wherein the lens module satisfies the following Conditional Expression:

$OAL/f < 1.5$ [Conditional Expression]

where OAL is a distance from an object-side surface of the first lens to an image surface, and f is the overall focal length of the lens module.

15. The lens module of claim 1, wherein the lens module satisfies the following Conditional Expression:

$1.0 < f1/f2 < 2.5$ [Conditional Expression]

where f1 is the focal length of the first lens, and f2 is a focal length of the second lens.

16. The lens module of claim 1, wherein the lens module satisfies the following Conditional Expression:

$0.3 < |f2/f3| < 2.0$ [Conditional Expression]

where f2 is a focal length of the second lens, and f3 is a focal length of the third lens.

17. The lens module of claim 1, wherein the lens module satisfies the following Conditional Expression:

$BFL/f > 0.2$ [Conditional Expression]

where BFL is a distance from the image-side surface of the sixth lens to an image surface, and f is the overall focal length of the lens module.

18. The lens module of claim 1, wherein the lens module satisfies the following Conditional Expression:

$D1/f > 0.01$ [Conditional Expression]

where D1 is an air gap between the first lens and the second lens, and f is the overall focal length of the lens module.

19. The lens module of claim 1, wherein the lens module satisfies the following Conditional Expression:

$r1/f > 0.3$ [Conditional Expression]

where r1 is a radius of curvature of an object-side surface of the first lens, and f is the overall focal length of the lens module.

20. The lens module of claim 1, wherein the lens module satisfies the following Conditional Expression:

$r6/f > 0.3$ [Conditional Expression]

where r6 is a radius of curvature of an image-side surface of the third lens, and f is the overall focal length of the lens module.

21. The lens module of claim 1, wherein the lens module satisfies the following Conditional Expression:

$$EPD/2/f1 > 0.1 \quad \text{[Conditional Expression]}$$

where EPD/2 is a size of an entrance pupil, and f1 is the focal length of the first lens.

22. The lens module of claim 1, wherein the lens module satisfies the following Conditional Expression:

$$|f3/f| < 2.0 \quad \text{[Conditional Expression]}$$

where f3 is a focal length of the third lens, and f is the overall focal length of the lens module.

23. The lens module of claim 1, wherein the lens module satisfies the following Conditional Expression:

$$f4/f > 3.0 \quad \text{[Conditional Expression]}$$

where f4 is a focal length of the fourth lens, and f is the overall focal length of the lens module.

24. The lens module of claim 1, wherein the lens module satisfies the following Conditional Expression:

$$|f5/f| > 3.0 \quad \text{[Conditional Expression]}$$

where f5 is a focal length of the fifth lens, and f is the overall focal length of the lens module.

25. The lens module of claim 1, wherein the lens module satisfies the following Conditional Expression:

$$|f6/f| < 6.0 \quad \text{[Conditional Expression]}$$

where f6 is a focal length of the sixth lens, and f is the overall focal length of the lens module.

26. The lens module of claim 1, wherein the lens module satisfies the following Conditional Expression:

$$OAL/f1 > 0.5 \quad \text{[Conditional Expression]}$$

where OAL is a distance from an object-side surface of the first lens to an image surface, and f1 is the focal length of the first lens.

27. The lens module of claim 1, wherein the lens module satisfies the following Conditional Expression:

$$0 < OAL/f2 < 1.7 \quad \text{[Conditional Expression]}$$

where OAL is a distance from an object-side surface of the first lens to an image surface, and f2 is a focal length of the second lens.

28. The lens module of claim 1, wherein the lens module satisfies the following Conditional Expression:

$$|OAL/f3| > 1.0 \quad \text{[Conditional Expression]}$$

where OAL is a distance from an object-side surface of the first lens to an image surface, and f3 is a focal length of the third lens.

29. The lens module of claim 1, wherein the lens module satisfies the following Conditional Expression:

$$0 < OAL/f4 < 0.5 \quad \text{[Conditional Expression]}$$

where OAL is a distance from an object-side surface of the first lens to an image surface, and f4 is a focal length of the fourth lens.

30. The lens module of claim 1, wherein the lens module satisfies the following Conditional Expression:

$$|OAL/f5| < 0.5 \quad \text{[Conditional Expression]}$$

where OAL is a distance from an object-side surface of the first lens to an image surface, and f5 is a focal length of the fifth lens.

31. The lens module of claim 1, wherein the lens module satisfies the following Conditional Expression:

$$|OAL/f6| > 0.2 \quad \text{[Conditional Expression]}$$

where OAL is a distance from an object-side surface of the first lens to an image surface, and f6 is a focal length of the sixth lens.

32. A lens module, comprising:
six lenses comprising a first lens, a second lens, a third lens, a fourth lens, a fifth lens, and a sixth lens, in order from an object side to an image side,
wherein:
the first and second lenses have positive refractive power,
the fifth lens comprises a concave object-side surface and a convex image-side surface,
the sixth lens is convex toward the object side and concave toward the image side at the center thereof, an object-side surface of the sixth lens having at least three inflection points, and
the lens module satisfies the following conditional expression:

$$1.0 < f1/f < 2.0$$

where f is an overall focal length of the lens module, and f1 is a focal length of the first lens.

33. The lens module of claim 32, wherein a distance between the third lens and the fourth lens is shorter than a distance between the fourth lens and the fifth lens.

34. The lens module of claim 32, further comprising a stop disposed between the second lens and the third lens.

35. The lens module of claim 32, wherein:
the first and third lenses comprise a convex object-side surface and a concave image-side surface,
the second lens comprises a biconvex surface,
the fourth lens comprises a concave object-side surface and a convex image-side surface, and
an image-side surface of the sixth lens has at least one inflection point.

36. The lens module of claim 32, wherein the lens module satisfies the following conditional expression:

$$|f1/f3| < 3.0$$

where f1 is the focal length of the first lens, and f3 is a focal length of the third lens.

37. The lens module of claim 32, wherein the lens module satisfies the following conditional expression:

$$0 < f1/f4 < 1.5$$

where f1 is the focal length of the first lens, and f4 is a focal length of the fourth lens.

38. The lens module of claim 32, wherein the lens module satisfies the following conditional expression:

$$|f1/f5| < 1.5$$

where f1 is the focal length of the first lens, and f5 is a focal length of the fifth lens.

39. The lens module of claim 32, wherein the lens module satisfies the following conditional expression:

$$|f1/f6| < 1.5$$

where f1 is the focal length of the first lens, and f6 is a focal length of the sixth lens.

40. The lens module of claim 1, wherein the lens module satisfies the following conditional expression:

$$V4/30 + V5/30 < 2.0$$

where V4 is an Abbe number of the fourth lens, and V5 is an Abbe number of the fifth lens.

41. The lens module of claim 32, wherein the lens module satisfies one or more of the following conditional expressions:

$$0.03 < IP611/2Y < 0.04, \quad \text{[Conditional Expression 1]}$$

$$0.20 < IP612/2Y < 0.30, \quad \text{[Conditional Expression 2]}$$

$$0.27 < IP613/2Y < 0.48, \quad \text{[Conditional Expression 3]}$$

where IP611 is a radius from an optical axis of the sixth lens to a first inflection point formed on an object-side surface of the sixth lens, IP612 is a radius from the optical axis of the sixth lens to a second inflection point formed on the object-side surface of the sixth lens, IP613 is a radius from the optical axis of the sixth lens to a third inflection point formed on the object-side surface of the sixth lens, and 2Y is a diagonal length of an image surface.

42. The lens module of claim 32, wherein the lens module satisfies one or more of the following conditional expressions:

$$0.08 < IP611/L61ER < 0.11, \quad \text{[Conditional Expression 1]}$$

$$0.54 < IP612/L61ER < 0.76, \quad \text{[Conditional Expression 2]}$$

$$0.97 < IP613/L61ER < 0.99, \quad \text{[Conditional Expression 3]}$$

where IP611 is a radius from an optical axis of the sixth lens to a first inflection point formed on an object-side surface of the sixth lens, IP612 is a radius from the optical axis of the sixth lens to a second inflection point formed on the object-side surface of the sixth lens, IP613 is a radius from the optical axis of the sixth lens to a third inflection point formed on the object-side surface of the sixth lens, and L61ER is a radius of an effective region on the object-side surface of the sixth lens.

43. The lens module of claim 1, wherein the lens module satisfies one or more of the following conditional expressions:

$$0.03 < IP621/2Y < 0.06, \quad \text{[Conditional Expression 1]}$$

$$0.25 < IP622/2Y < 0.46, \quad \text{[Conditional Expression 2]}$$

$$0.38 < IP623/2Y < 0.43, \quad \text{[Conditional Expression 3]}$$

where IP621 is a radius from an optical axis of the sixth lens to a first inflection point formed on an image-side surface of the sixth lens, IP622 is a radius from the optical axis of the sixth lens to a second inflection point formed on the image-side surface of the sixth lens, IP623 is a radius from the optical axis of the sixth lens to a third inflection point on the image-side surface of the sixth lens, and 2Y is a diagonal length of an image surface.

44. The lens module of claim 1, wherein the lens module satisfies one or more of the following conditional expressions:

$$0.09 < IP621/L62ER < 0.13, \quad \text{[Conditional Expression 1]}$$

$$0.85 < IP622/L62ER < 0.89, \quad \text{[Conditional Expression 2]}$$

$$0.94 < IP623/L62ER < 0.99, \quad \text{[Conditional Expression 3]}$$

where IP621 is a radius from an optical axis of the sixth lens to a first inflection point formed on an image-side surface of the sixth lens, IP622 is a radius from the optical axis of the sixth lens to a second inflection point formed on the image-side surface of the sixth lens, IP623 is a radius from the optical axis of the sixth lens to a third inflection point formed on the image-side surface of the sixth lens, and L62ER is a radius of an effective region on the image-side surface of the sixth lens.

45. The lens module of claim 1, wherein the lens module satisfies one or more of the following conditional expressions:

$$1.02 < Pt1/CT6 < 1.25, \quad \text{[Conditional Expression 1]}$$

$$1.15 < Pt2/CT6 < 1.43, \quad \text{[Conditional Expression 2]}$$

$$1.02 < Pt3/CT6 < 1.36, \quad \text{[Conditional Expression 3]}$$

$$0.79 < Pt1/Pt2 < 0.97, \quad \text{[Conditional Expression 4]}$$

$$0.83 < Pt1/Pt3 < 1.12, \quad \text{[Conditional Expression 5]}$$

$$0.94 < Pt2/Pt3 < 1.27, \quad \text{[Conditional Expression 6]}$$

where CT6 is a thickness of the sixth lens along an optical axis, Pt1 is a thickness at a first concave point, Pt2 is a thickness at a first convex point, and Pt3 is thickness at a second convex point.

* * * * *